(12) United States Patent
Suzuki

(10) Patent No.: US 12,378,012 B2
(45) Date of Patent: Aug. 5, 2025

(54) AERIAL VEHICLE

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 18/573,267

(22) PCT Filed: Jun. 22, 2021

(86) PCT No.: PCT/JP2021/023633
§ 371 (c)(1),
(2) Date: Dec. 21, 2023

(87) PCT Pub. No.: WO2022/269762
PCT Pub. Date: Dec. 29, 2022

(65) Prior Publication Data
US 2024/0278943 A1  Aug. 22, 2024

(51) Int. Cl.
*B64U 10/14* (2023.01)
*B64U 20/77* (2023.01)
*B64U 30/21* (2023.01)

(52) U.S. Cl.
CPC ............ *B64U 10/14* (2023.01); *B64U 20/77* (2023.01); *B64U 30/21* (2023.01)

(58) Field of Classification Search
CPC ........ B64U 10/14; B64U 20/77; B64U 30/21; B64U 10/13; B64U 30/20; B64U 50/19; B64C 1/00; B64C 23/00; B64C 27/08; B64C 39/02; B64C 39/024; B64C 1/0009
See application file for complete search history.

(56) References Cited

U.S. PATENT DOCUMENTS 8,725,314 B2 * 5/2014 Chaperon .............. A63H 27/12
  701/2
9,676,477 B1 * 6/2017 Kimchi .................... B64C 27/00
9,821,909 B2 * 11/2017 Moshe ..................... B64C 27/22
(Continued)

FOREIGN PATENT DOCUMENTS

CN        106184737 A    12/2016
CN        108557094 A     9/2018
JP       2019172256 A    10/2019

OTHER PUBLICATIONS

International Search Report dated Jul. 20, 2021 for International Application No. PCT/JP2021/023633.

*Primary Examiner* — Medhat Badawi
(74) *Attorney, Agent, or Firm* — HAUPTMAN HAM, LLP

(57) ABSTRACT

According to this invention, an aerial vehicle can be provided that reduces the effect of wind in a given direction striking its frame during flight of the aerial vehicle, thereby improving fuel consumption and stability. The aerial vehicle of this invention is equipped with a flight part including a frame to which a plurality of rotor blades including at least a propeller and a motor are connected, wherein the frame includes a right frame and a left frame extending side by side in the front-rear direction of the aerial vehicle, and at least one of the right frame and the left frame has a substantially wing-shaped portion with a leading edge located outside the aerial vehicle and a trailing edge located inside the aerial vehicle relative to a vertical center line in the frame. The substantially wing-shaped shape is a symmetrical wing shape.

17 Claims, 33 Drawing Sheets

(56) References Cited

U.S. PATENT DOCUMENTS

| | | | | |
|---|---|---|---|---|
| 9,957,045 | B1* | 5/2018 | Daly | B64U 50/19 |
| 10,081,436 | B1* | 9/2018 | Tian | B64U 10/20 |
| 10,137,982 | B1* | 11/2018 | Dormiani | B64C 27/30 |
| 10,183,746 | B2* | 1/2019 | McCullough | B64D 25/12 |
| 10,214,285 | B2* | 2/2019 | McCullough | G05D 1/0011 |
| 10,301,016 | B1* | 5/2019 | Bondarev | B64C 39/04 |
| 10,301,020 | B2* | 5/2019 | Jones | B64D 1/00 |
| 10,315,761 | B2* | 6/2019 | McCullough | B64C 39/02 |
| 10,442,522 | B2* | 10/2019 | Oldroyd | B64C 27/52 |
| 10,472,063 | B2* | 11/2019 | Wu | B64U 30/291 |
| 10,597,164 | B2* | 3/2020 | Oldroyd | G05D 3/00 |
| 10,661,892 | B2* | 5/2020 | McCullough | B64C 25/04 |
| 10,737,778 | B2* | 8/2020 | Oldroyd | B64C 1/32 |
| 10,870,487 | B2* | 12/2020 | McCullough | B64D 25/12 |
| 10,981,661 | B2* | 4/2021 | Oldroyd | B64C 27/52 |
| 11,027,837 | B2* | 6/2021 | McCullough | B64C 27/57 |
| 11,040,768 | B2* | 6/2021 | Bailly | B64C 17/02 |
| 11,052,998 | B2* | 7/2021 | Mores | B60L 50/60 |
| 11,220,325 | B2* | 1/2022 | Kiesewetter | B64C 11/001 |
| 11,267,570 | B2* | 3/2022 | Villa | B64C 27/30 |
| 11,511,854 | B2* | 11/2022 | Baity | B64U 30/297 |
| 11,603,194 | B2* | 3/2023 | McCullough | B64D 35/00 |
| 11,608,173 | B2* | 3/2023 | McCullough | B64C 39/08 |
| 11,608,184 | B2* | 3/2023 | Klonowski | B64C 27/16 |
| 11,613,353 | B2* | 3/2023 | Newman | B64C 27/52 244/120 |
| 11,639,230 | B1* | 5/2023 | Wiegman | B60L 50/61 244/55 |
| 11,643,207 | B1* | 5/2023 | Ross | B64U 70/50 244/3 |
| 11,702,202 | B1* | 7/2023 | Anderson | B64U 30/293 244/17.23 |
| 11,731,759 | B2* | 8/2023 | Ol | B64C 27/32 244/17.23 |
| 11,794,888 | B1* | 10/2023 | Taylor | B64C 39/024 |
| 11,905,007 | B2* | 2/2024 | Bower | B64C 23/069 |
| 11,932,387 | B2* | 3/2024 | Wittmaak, Jr. | G05D 1/0858 |
| 11,975,821 | B2* | 5/2024 | Ishikawa | B64U 60/40 |
| 11,975,824 | B2* | 5/2024 | Gharib | B64U 10/13 |
| D1,045,668 | S* | 10/2024 | Foster | D12/16.1 |
| 12,103,673 | B2* | 10/2024 | Hefner | B64C 29/00 |
| 12,134,466 | B2* | 11/2024 | Rysdyk | B64U 30/12 |
| 12,145,736 | B2* | 11/2024 | Wiegman | B64C 27/30 |
| 12,145,753 | B2* | 11/2024 | Bitar | B64U 50/30 |
| 2010/0301168 | A1* | 12/2010 | Raposo | B64C 27/82 244/171.2 |
| 2015/0158581 | A1* | 6/2015 | Fengler | B64C 27/16 244/17.23 |
| 2015/0259066 | A1* | 9/2015 | Johannesson | B64U 20/50 244/17.27 |
| 2016/0325829 | A1* | 11/2016 | Ahn | B64U 10/14 |
| 2017/0240274 | A1* | 8/2017 | Regev | B64D 35/02 |
| 2018/0002012 | A1* | 1/2018 | McCullough | B64U 10/16 |
| 2018/0002013 | A1* | 1/2018 | McCullough | B64U 50/19 |
| 2018/0029703 | A1* | 2/2018 | Simon | B64U 30/26 |
| 2018/0205242 | A1* | 7/2018 | Kelly-Morgan | H01G 4/14 |
| 2018/0244377 | A1* | 8/2018 | Chan | B64C 27/12 |
| 2018/0265191 | A1* | 9/2018 | Sakuma | G05D 1/0808 |
| 2018/0312254 | A1* | 11/2018 | Ni | B64U 30/293 |
| 2019/0031361 | A1* | 1/2019 | McCullough | B64D 27/40 |
| 2019/0011204 | A1 | 4/2019 | Nicholas | |
| 2019/0112047 | A1* | 4/2019 | Bowers | B64U 30/10 |
| 2019/0144108 | A1* | 5/2019 | McCullough | G05D 1/101 244/23 B |
| 2019/0263519 | A1* | 8/2019 | Argus | B64C 27/26 |
| 2019/0322368 | A1* | 10/2019 | Melcher | B64C 37/00 |
| 2020/0001995 | A1* | 1/2020 | Yang | B64C 29/0016 |
| 2020/0140085 | A1* | 5/2020 | Deng | B64U 20/87 |
| 2020/0172241 | A1* | 6/2020 | Green | B64U 10/13 |
| 2021/0016880 | A1* | 1/2021 | Ishikawa | F02B 63/04 |
| 2021/0197965 | A1* | 7/2021 | Kunz | B64U 30/14 |
| 2021/0362848 | A1* | 11/2021 | Spencer | B64C 29/0033 |
| 2022/0009626 | A1* | 1/2022 | Baharav | B64C 27/26 |
| 2022/0097840 | A1* | 3/2022 | Acikel | B64D 31/06 |
| 2022/0185464 | A1* | 6/2022 | Gharib | B64C 27/82 |
| 2023/0234703 | A1* | 7/2023 | Brown | B64C 11/04 244/7 R |
| 2023/0415892 | A1* | 12/2023 | Suzuki | B64D 9/003 |
| 2024/0208643 | A1* | 6/2024 | Suzuki | B64C 3/40 |
| 2024/0217644 | A1* | 7/2024 | Suzuki | B64C 1/061 |
| 2024/0228078 | A1* | 7/2024 | Suzuki | B64U 10/14 |
| 2024/0278943 | A1* | 8/2024 | Suzuki | B64U 30/20 |
| 2024/0336377 | A1* | 10/2024 | Suzuki | B64U 10/60 |
| 2024/0343425 | A1* | 10/2024 | Ishikawa | B64U 50/33 |
| 2024/0351684 | A1* | 10/2024 | Suzuki | B64D 1/22 |
| 2024/0377839 | A1* | 11/2024 | Suzuki | B64C 27/473 |
| 2024/0383603 | A1* | 11/2024 | Hamm | B64U 10/14 |

* cited by examiner

AERIAL VEHICLE

TECHNICAL FIELD

This invention relates to aerial vehicles.

BACKGROUND ART

In recent years, research and demonstration tests have been conducted toward the practical application of services using aerial vehicles such as drones and unmanned aerial vehicles (UAVs) (hereinafter collectively referred to as "aerial vehicles"). In practical applications, there is a need to improve the cruising range, size and weight of the objects that can be carried (payload), and stability.

When an aerial vehicle is used for transporting loads or people, it is often used for long flights in a certain direction, unlike in hobby or photographic applications. The aerial vehicles widely available in the market, which are composed of cylindrical pipes radially assembled as shown in FIG. 33 (hereinafter collectively referred to as "existing aerial vehicles"), do not take relative wind into consideration, and it is difficult to improve their flight efficiency.

In Patent Literature 1, an aerial vehicle is disclosed with a shape that improves fuel efficiency when the aerial vehicle cruises in the nose direction.

PRIOR ART LIST

Patent Literature

[Patent Literature 1] US20200001995A1

SUMMARY OF THE INVENTION

Technical Problem

Patent Literature 1 discloses an aerial vehicle that can reduce drag against relative winds from the front of the aerial vehicle and improve fuel efficiency of the aerial vehicle by providing an airfoil-shaped main body part to the aerial vehicle that can carry loads.

This will allow aerial vehicles to fly for longer periods of time than existing aircraft, thereby expanding the use of services such as home delivery and reducing the fuel consumption of aerial vehicles.

However, the aerial vehicle shape disclosed in Patent Literature 1 only takes into account the case where the aerial vehicle receives wind from the front of the aerial vehicle. When an aerial vehicle flies outdoors, it is subject to various winds, such as those generated by the forward movement of the aerial vehicle, wind from the side of the aerial vehicle due to environmental winds, and wind generated by the propeller of the aerial vehicle.

Aerial vehicles that do not take into account the reduction of drag against various winds, streamlining, etc., do not provide sufficient fuel efficiency or stability in outdoor flight.

Therefore, one object of this invention is to provide an aerial vehicle that can further improve fuel efficiency and stability of the aerial vehicle during cruise by optimizing the frame shape for relative winds from a given direction.

Technical Solution

The invention provides an aerial vehicle with a flight part including a frame to which a plurality of rotary wing parts including at least a propeller and a motor are connected, wherein the frame has at least two or more different cross-sectional shapes, depending on its position.

Advantageous Effects

The invention can provide aerial vehicles that reduce the effect of wind in a given direction hitting the frame during aerial vehicle flight, thereby improving fuel efficiency and stability.

BRIEF DESCRIPTION OF THE DRAWINGS

FIG. 18 shows examples of the cross-sectional shapes of the left and right frames of a pull-type rotary wing part.

EMBODIMENT OF THE INVENTION

Figure 1:
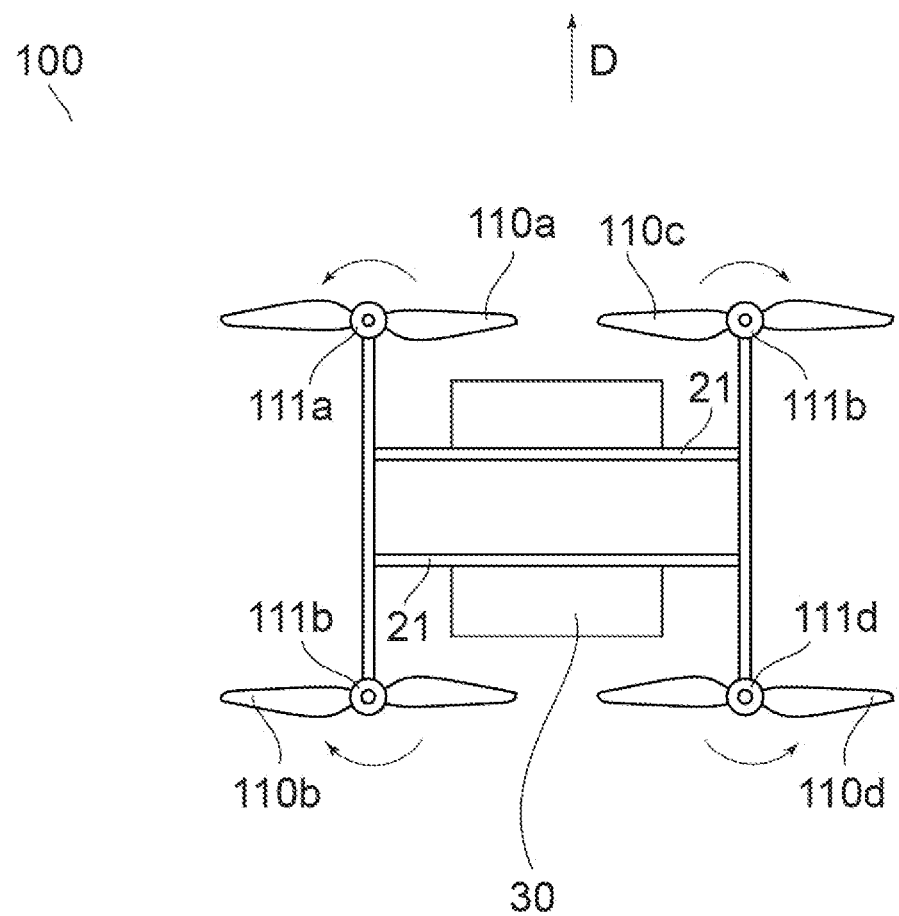
FIG. 1 is a conceptual view of the aerial vehicle according to the invention from the top.
Figure 1:
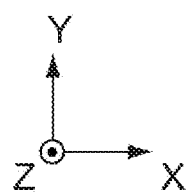

The following is a list and description of the contents of this embodiment of the invention. The aerial vehicle according to this embodiment of the invention consists of the following.

[Item 1]

An aerial vehicle, comprising a flight part including a frame to which a plurality of rotary wing parts including at least a propeller and a motor are connected,
wherein the frame has at least two or more different cross-sectional shapes according to its position.

[Item 2]

The aerial vehicle according to item 1,
wherein the frame comprises a right frame and a left frame extending side-by-side in the front-rear direction of the aerial vehicle,
wherein at least one of the right frame and the left frame has a substantially wing-shaped portion with the leading edge located outside the aerial vehicle and the trailing edge located inside the aerial vehicle with respect to a vertical center line in the frame.

[Item 3]

The aerial vehicle according to item 2,
wherein the substantially wing-shaped shape is a symmetric wing-shaped shape.

[Item 4]

The aerial vehicle according to item 1,
wherein the frame includes a right frame and a left frame extending side-by-side in the front-rear direction of the aerial vehicle,
wherein, in at least one of the right frame and the left frame, the frame portion at least below the radius of rotation of the pull-type rotor blade has a substantially wing-shaped portion inclined in a direction corresponding to the direction of rotation of the propeller, and other frame portions have a substantially wing-shaped portion with the leading edge located on the upper side of the aerial vehicle and the trailing edge located on the lower side of the aerial vehicle along a vertical center line in the frame.

[Item 5]

The aerial vehicle according to item 1,
wherein the frame includes a right frame and a left frame extending side-by-side in the front-rear direction of the aerial vehicle,
wherein, in at least one of the right frame and the left frame, the frame portion at least below the radius of rotation of the pull-type rotor blade has a substantially wing-shaped portion inclined in a direction corresponding to the direction of rotation of the propeller, and the frame portion at least above the radius of rotation of the push-type rotor blade has a substantially wing-shaped portion inclined in the direction of streamlining the air flowing to the propeller.

[Item 6]

The aerial vehicle according to 1,
wherein the frame includes a right frame and a left frame extending side-by-side in the front-rear direction of the aerial vehicle,
wherein, in at least one of the right frame and the left frame, the frame portion at least below the radius of rotation of the pull-type rotor blade has a substantially wing-shaped portion inclined in a direction corresponding to the direction of rotation of the propeller, and the other portion has an inclination at an angle different from the inclination and has a substantially wing-shaped portion with the leading edge located on the outside of the aerial vehicle and the trailing edge located on the inside of the aerial vehicle with respect to the vertical center line of the frame.

[Item 7]

The aerial vehicle as in any one of item 1 to item 6,
wherein the frame includes a front frame and a rear frame,
wherein the lateral area of the rear frame is wider than the lateral area of the front frame.

[Item 8]

The aerial vehicle as in any one of item 1 to item 6,
wherein the frame includes a frame portion located below the radius of rotation of the pull-type rotor blades,
wherein the frame portion is forward of the front frame and has a wider lateral area than the rear frame.

DETAILS OF EMBODIMENTS ACCORDING TO THIS DISCLOSURE

Details of the First Embodiment

As shown in FIG. 1, the aerial vehicle 100 according to this embodiment has a flight part 20 that includes a plurality of rotary wing parts comprising at least a propeller 110 and a motor 111 and a frame 21 that connects the rotary wing parts and other elements in order to operate the flight. It should also be equipped with energy (e.g., secondary batteries, fuel cells, fossil fuel, etc.) to operate them. The aerial vehicle can be a single-rotor aircraft or a fixed-wing aircraft, but it is preferable to use a VTOL aircraft capable of vertical takeoff and landing or a so-called multicopter, a rotary-wing aircraft with multiple rotor blades, especially for home delivery applications to private homes. By using an aircraft that can take off and land vertically, it is possible to reduce the size of the peripheral equipment, including the ports for takeoff and landing.

The illustrated aerial vehicle 100 is depicted in simplified form to facilitate the explanation of the invention's structure, and detailed components such as the control part, for example, are not shown.

The aerial vehicle 100 moves forward in the direction of arrow D (+Y) in figures. (see below for details).

In the following explanation, the terms may be used according to the following definitions. Forward and backward: +Y and −Y, up and down (or vertical): +Z and −Z, left and right (or horizontal): +X and −X, forward direction (forward): −Y, rearward direction (backward) direction (backward): +Y direction, ascending direction (upward): +Z direction, descending direction (downward): −Z direction.

The propeller 110 rotates under the output from the motor 111. The rotation of the propeller 110 generates propulsive force to take the aerial vehicle 100 off from its starting point, move it, and land it at its destination. The propeller 110 can rotate to the right, stop, and rotate to the left.

The propeller 110 provided by the aerial vehicle of the invention has one or more blades. Any number of blades (rotors) (e.g., 1, 2, 3, 4, or more blades) is acceptable. The shape of the blades can be any shape, such as flat, curved, kinked, tapered, or a combination thereof. The shape of the blades can be changeable (e.g., stretched, folded, bent, etc.). The blades can be symmetrical (having identical upper and lower surfaces) or asymmetrical (having differently shaped upper and lower surfaces). The blades can be formed into airfoils, wings, or any geometry suitable for generating dynamic aerodynamic forces (e.g., lift, thrust) as the blades are moved through the air. The geometry of the vane can be selected as appropriate to optimize the dynamic aerodynamic characteristics of the vane, such as increasing lift and thrust and reducing drag.

The propeller provided by the aerial vehicle of the invention may be, but is not limited to, fixed pitch, variable pitch, or a mixture of fixed and variable pitch.

The motor 111 produces rotation of the propeller 110; for example, the drive unit can include an electric motor or engine. The blades can be driven by the motor and rotate around the axis of rotation of the motor (e.g., the long axis of the motor).

The blades can all rotate in the same direction or can rotate independently. Some of the blades rotate in one direction while others rotate in the other direction. The blades can all rotate at the same RPM, or they can each rotate at a different RPM. The number of rotations can be determined automatically or manually based on the dimensions of the moving object (e.g., size, weight) and the control conditions (speed, direction of movement, etc.).

The aerial vehicle 100 determines the number of rotations of each motor and the angle of flight according to the wind speed and direction by means of a flight controller or propo/radio. This allows the aerial vehicle to perform movements such as ascending and descending, accelerating and decelerating, and changing direction.

The aerial vehicle 100 can fly autonomously according to routes and rules set in advance or during the flight, or it can be piloted using a propo/radio.

Figure 6:
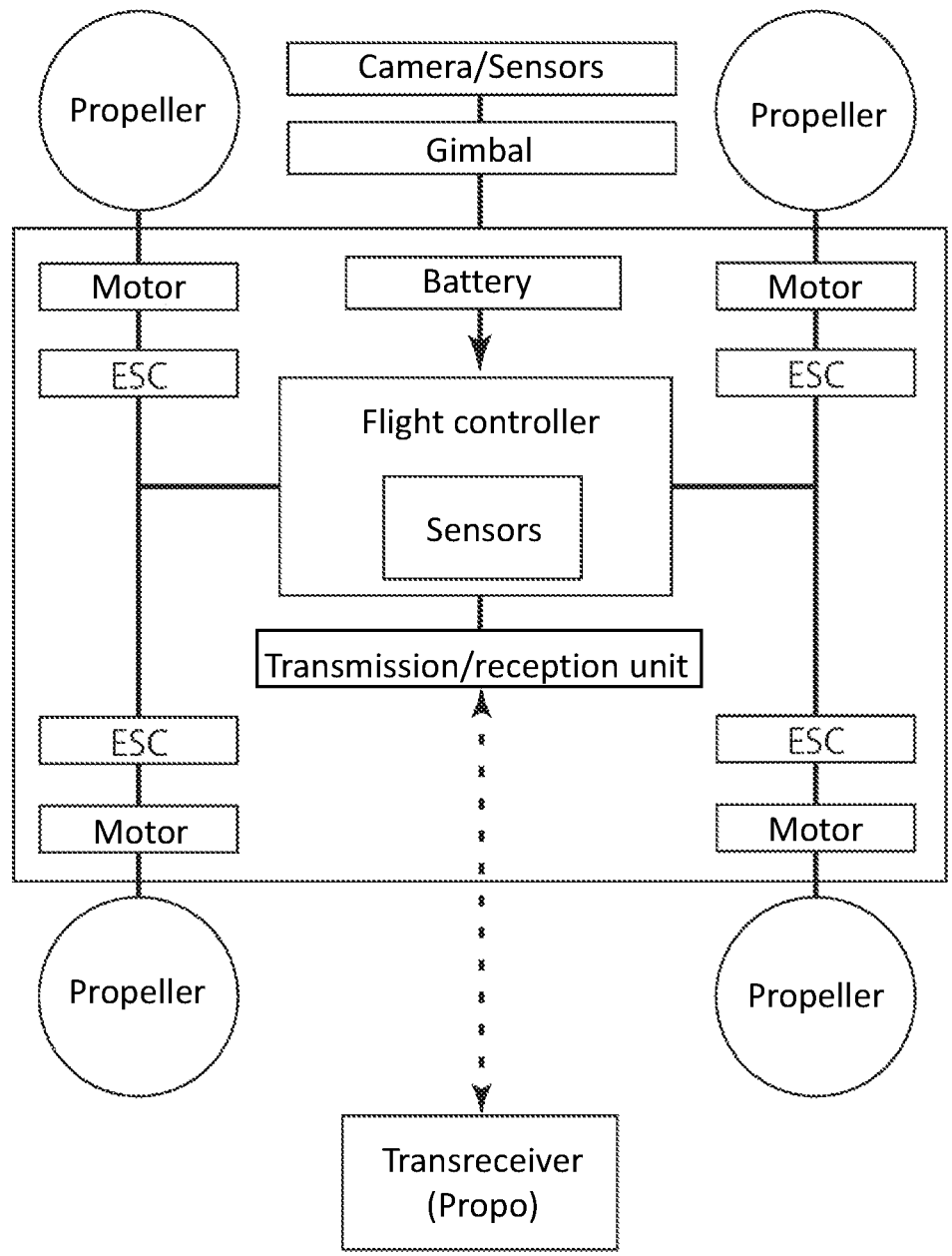
FIG. 6 is a functional block diagram of the aerial vehicle of FIG. 1.
Figure 7:
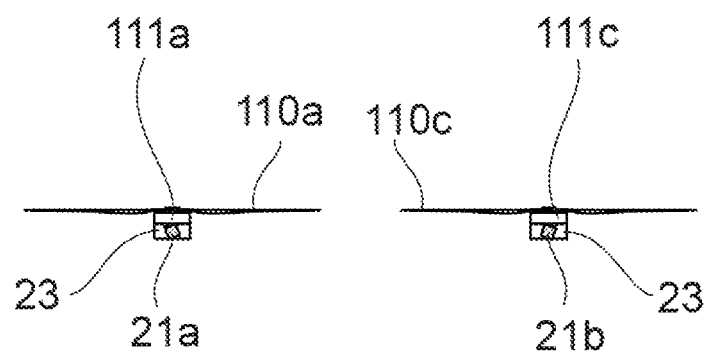
FIG. 7 is an A-A' cross-sectional view of the aerial vehicle of FIG. 1.
Figure 7:
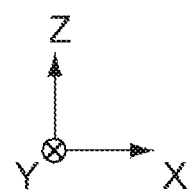
Figure 8:
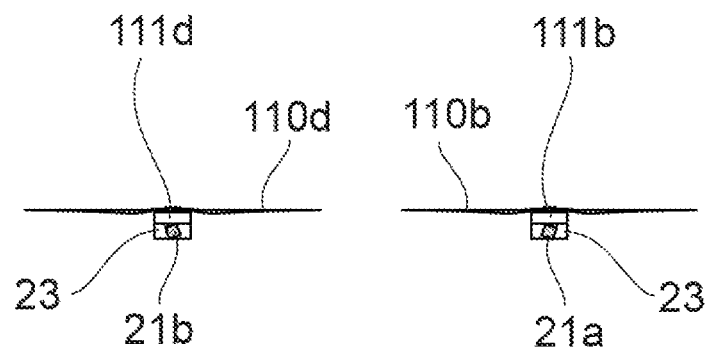
FIG. 8 is a B-B' cross section of the aerial vehicle of FIG. 1.
Figure 8:
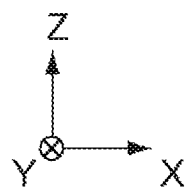
Figure 9:
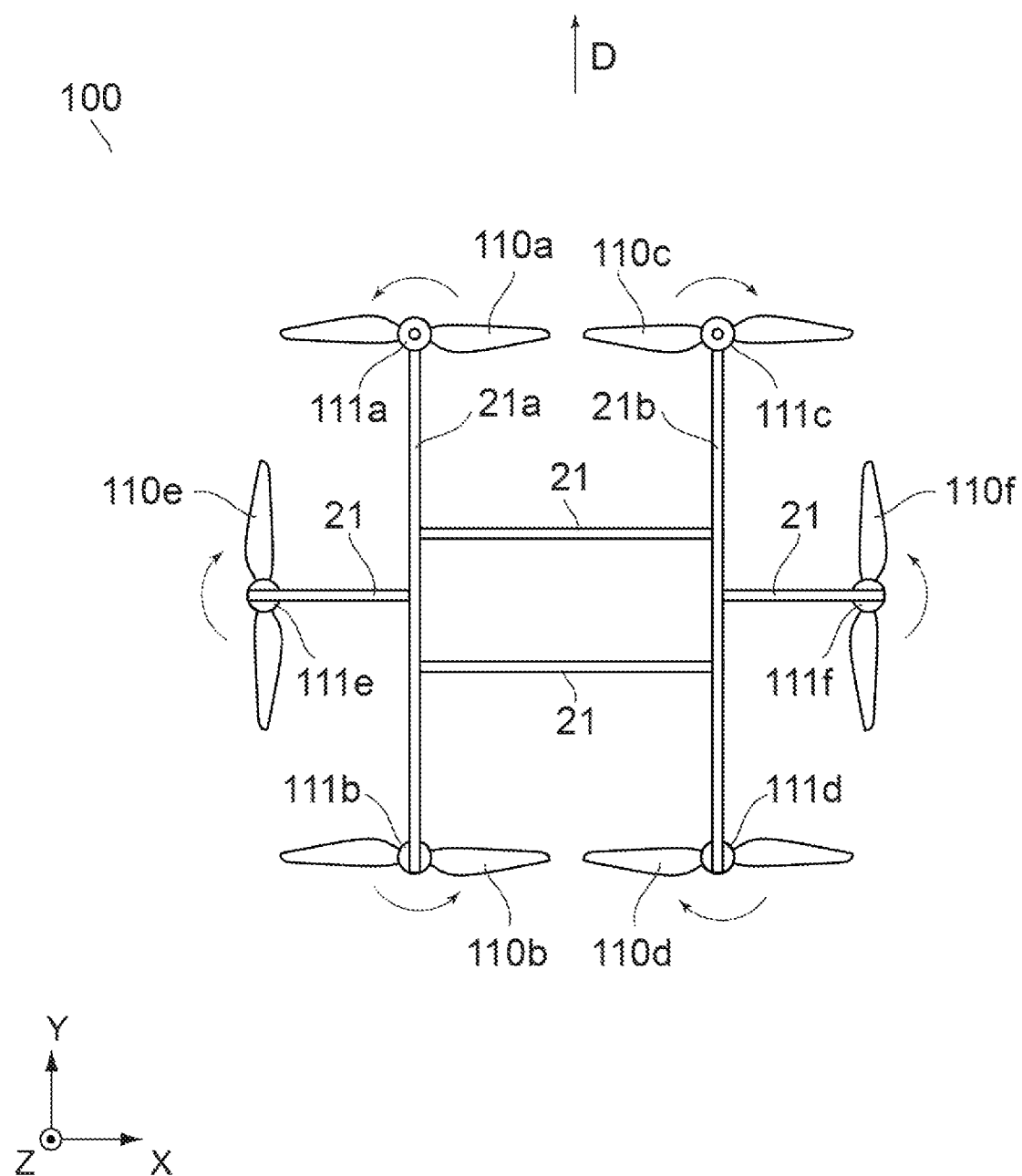
FIG. 9 is a conceptual view of other aerial vehicles according to the invention, viewed from the top.
Figure 10:
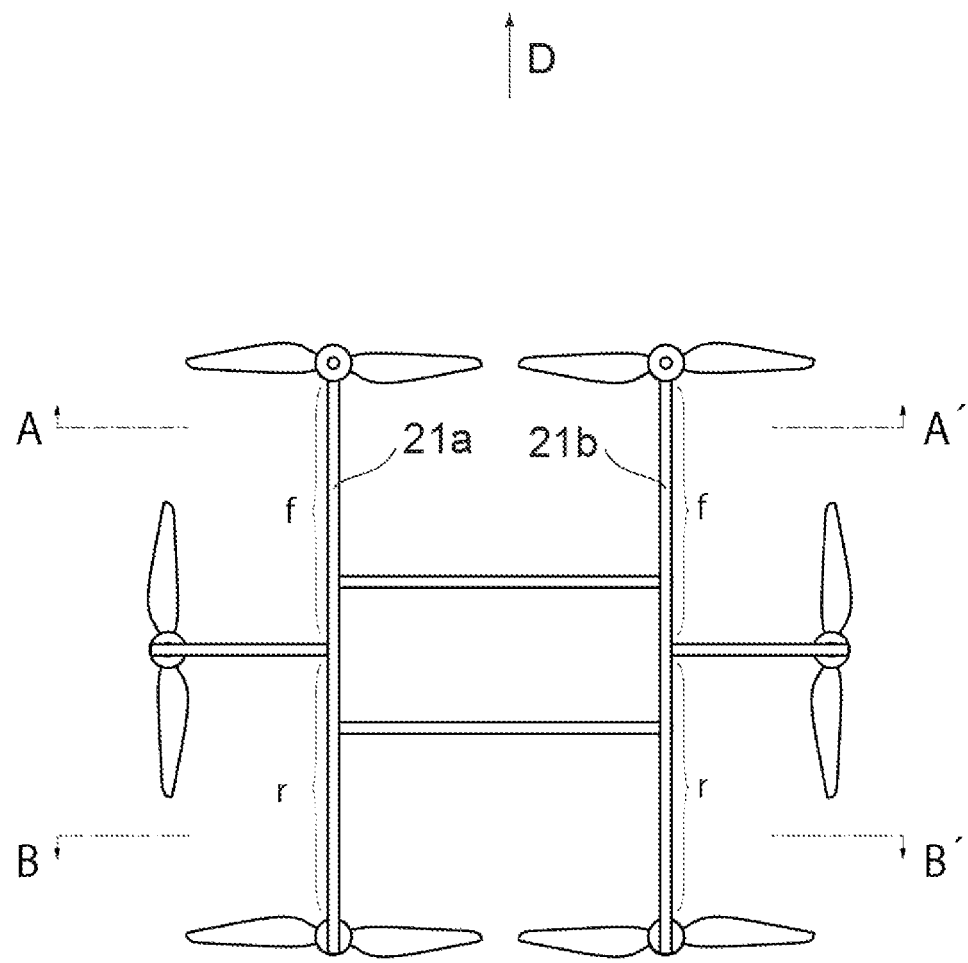
FIG. 10 is other top view of the aerial vehicle of FIG. 9.
Figure 11:
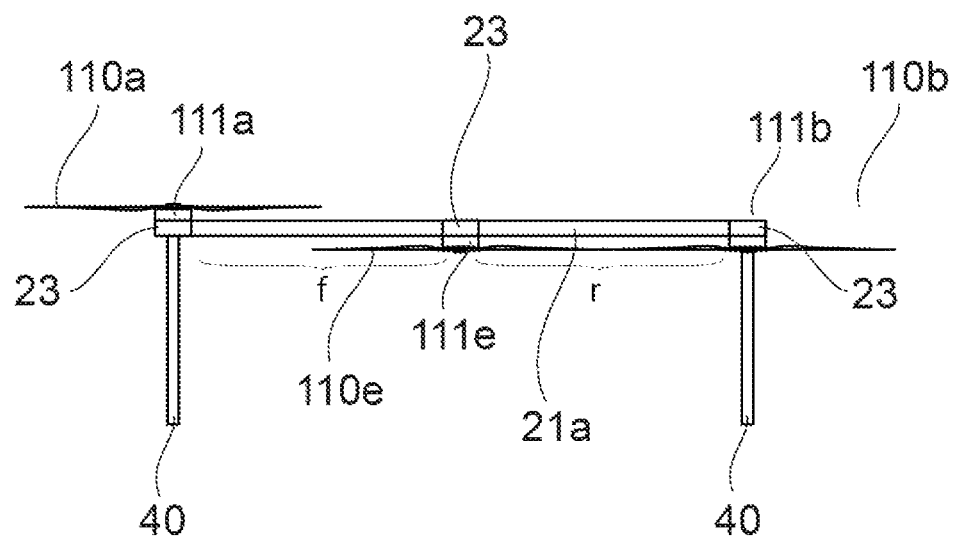
FIG. 11 is a side view of the aerial vehicle of FIG. 9.
Figure 11:
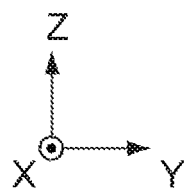

The aerial vehicle 100 described above has the functional blocks shown in FIG. 6. The functional blocks in FIG. 6 are a minimum reference configuration. The flight controller is a so-called processing unit. The processing unit can have one or more processors, such as a programmable processor (e.g., central processing unit (CPU)). The processing unit has a memory, not shown, which is accessible. The memory stores logic, code, and/or program instructions that can be executed by the processing unit to perform one or more steps. The memory may include, for example, a separable medium such as an SD card, random access memory (RAM), or an external storage device. Data acquired from cameras and sensors may be directly transmitted to and stored in the memory. For example, still and moving image data captured by a camera or other device is recorded in the internal or external memory.

The processing unit includes a control module comprising to control the state of the rotorcraft. For example, the control module controls the propulsion mechanism (e.g., motor) of the rotorcraft to adjust the spatial arrangement, velocity, and/or acceleration of the rotorcraft having six degrees of freedom (translational motion x, y and z, and rotational motion θx, θy and θz). The control module can control one or more of the states of the loading part, sensors, etc.

The processing unit is capable of communicating with a transmission/reception unit comprised of one or more external devices (e.g., terminal, display, or other remote controller) to transmit and/or receive data. The transceiver can use any suitable means of communication, such as wired or wireless communication. For example, the transmission/reception unit can use one or more of the following: local area network (LAN), wide area network (WAN), infrared, wireless, WiFi, point-to-point (P2P) network, telecommunications network, or cloud communications. The transmission/reception unit can transmit and/or receive one or more of the following: data acquired by sensors or the likes, processed results generated by the processing unit, predetermined control data, user commands from a terminal or remote controller, and so on.

Sensors in this embodiment can include inertial sensors (accelerometers, gyroscopes), GPS sensors, proximity sensors (e.g., lidar), or vision/image sensors (e.g., cameras).

Figure 2:
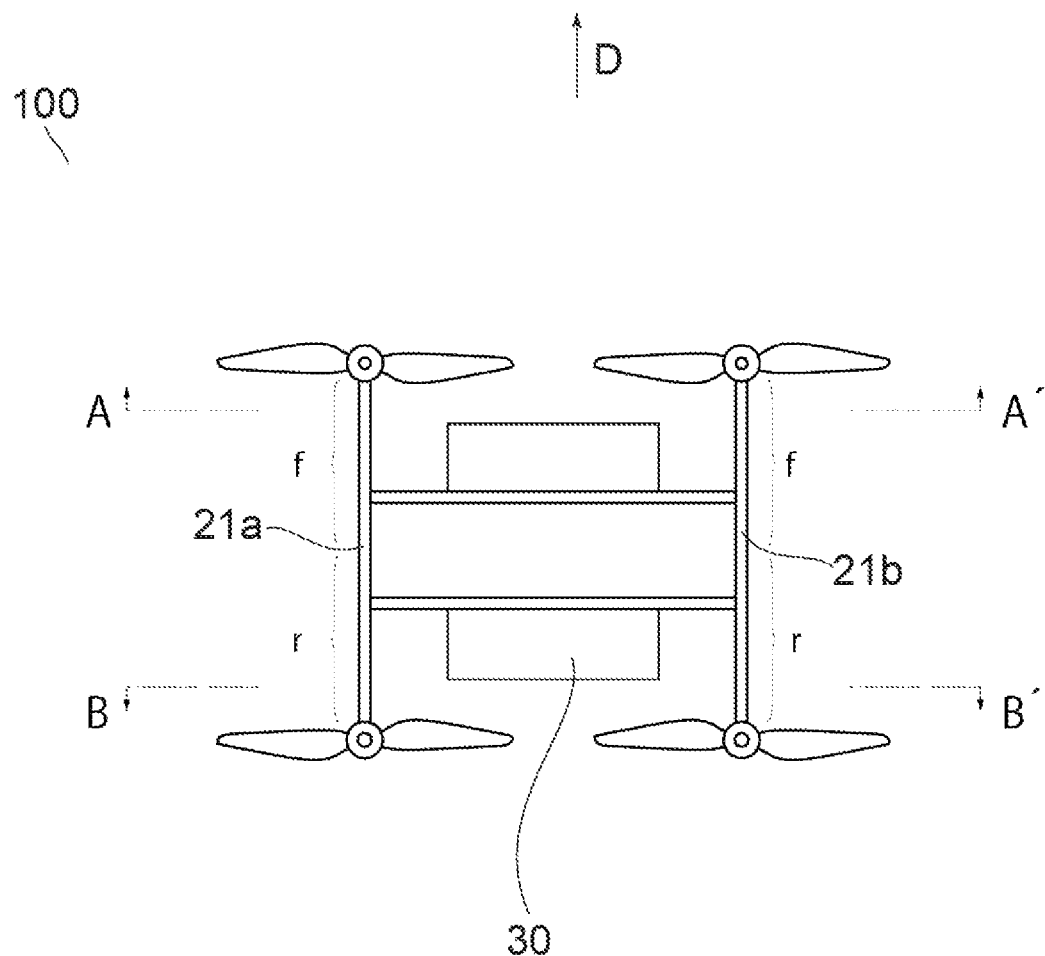
FIG. 2 is other top view of the aerial vehicle of FIG. 1.
Figure 3:
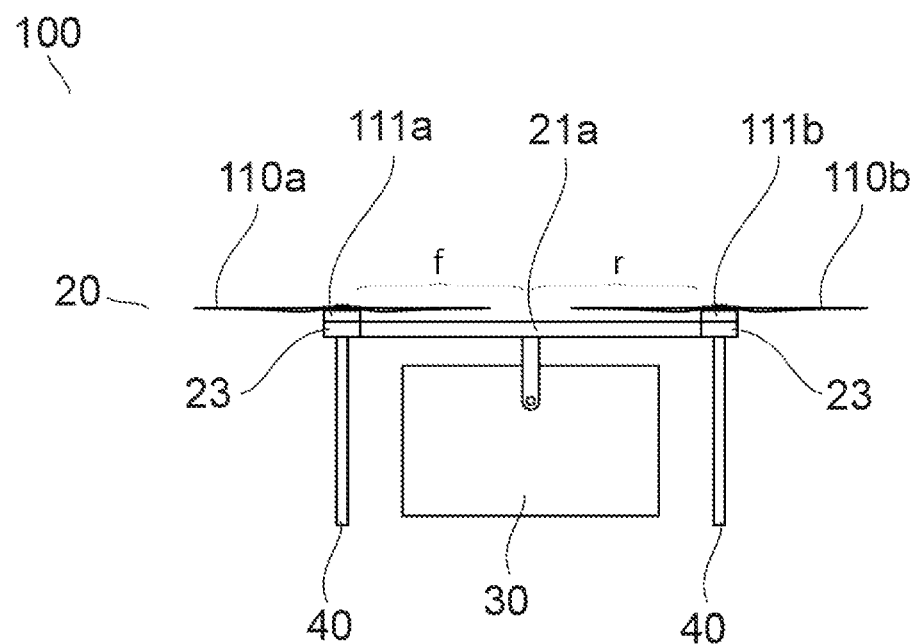
FIG. 3 is a side view of the aerial vehicle of FIG. 1.
Figure 3:
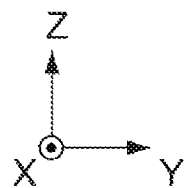
Figure 4:
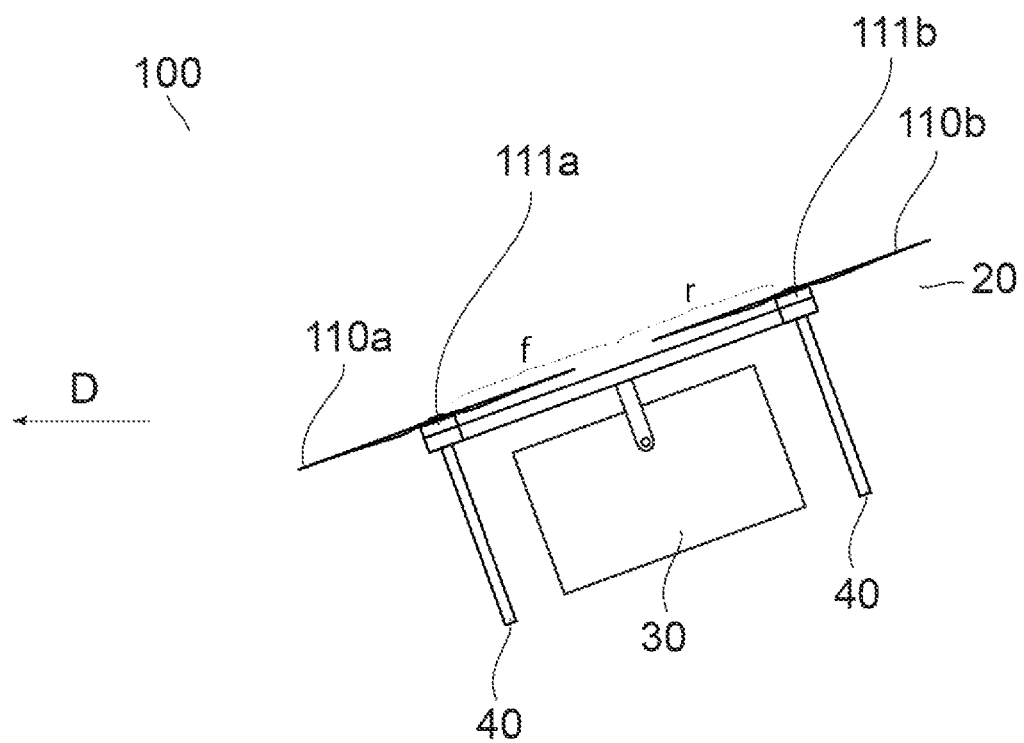
FIG. 4 is a side view of the aerial vehicle of FIG. 1 in cruise.
Figure 5:
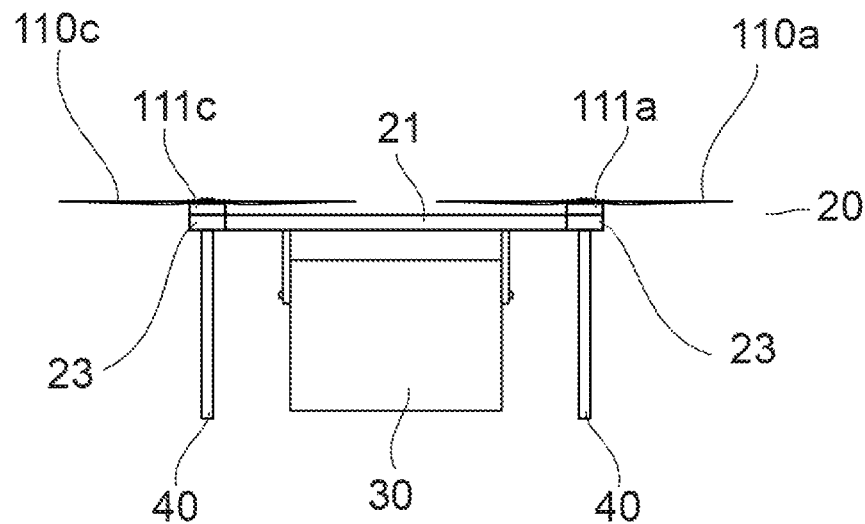
FIG. 5 is a front view of the aerial vehicle of FIG. 1.
Figure 5:
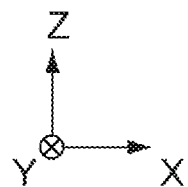

As shown in FIG. 2-FIG. 4, flight part 20 provided by the aerial vehicle 100 in this embodiment faces in the direction of travel when advancing and is tilted forward compared to when hovering. The forward-tilted rotor blades produce upward lift and thrust in the direction of travel, which propels the aerial vehicle 100 forward.

The aerial vehicle 100 may be equipped with a loading part 30 that can fly while holding a load, a person, a sensor or a robot for work (hereinafter collectively referred to as the "load") to be transported to the destination. The loading part 30 may be fixedly connected to the flight part 20 or independently displaceable through a connection part such as a rotating axis or a gimbal having one or more degrees of freedom, so that the object can be maintained in a predetermined attitude (e.g., horizontal) regardless of the attitude of the aerial vehicle 100.

Figure 32:
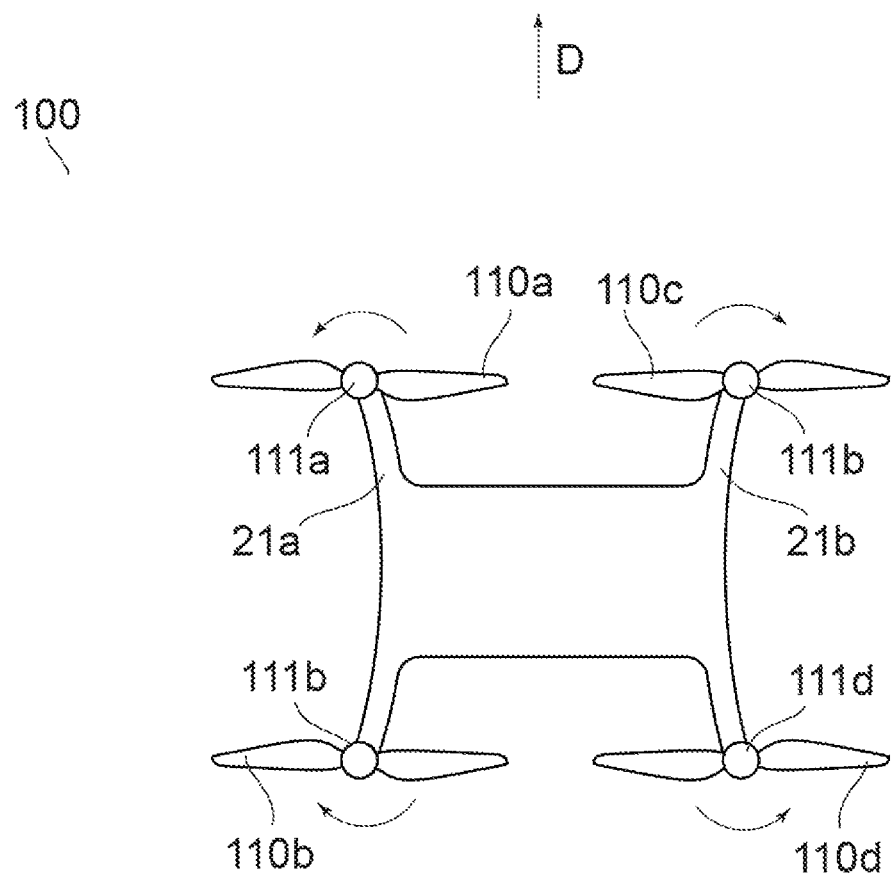
FIG. 32 is a conceptual view of other aerial vehicles according to the invention, viewed from the top.
Figure 33:
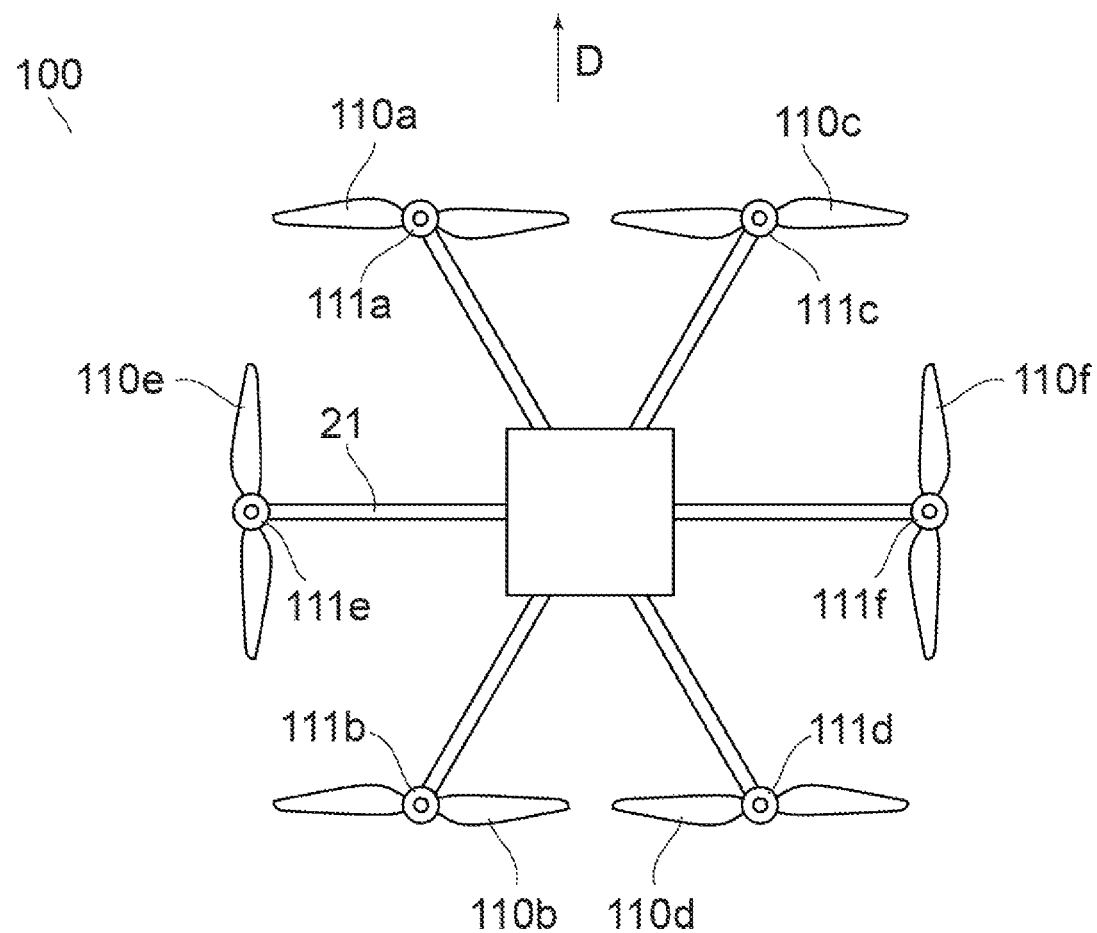
FIG. 33 is a conceptual view of the existing airframe from the top.

Known aerial vehicle flight part shapes generally include radial frames as shown in FIG. 33, ladder-shaped frames as shown in FIG. 1, and monocoque frames as shown in FIG. 32. Radial and ladder-shaped frames are made of carbon or metal pipes with a circular or square cross-sectional shape of the frame. Radial frames are considered suitable for use in photographic and hobby applications where the direction of travel is not specified, because the drag force and other characteristics of the frame do not change significantly no matter which direction the aerial vehicle travels.

However, the frame 21 of the flight part 20 provided by the aerial vehicle according to the invention should be specialized in a specific direction (e.g., nose direction), which is used for a longer period of time in applications such as transportation of people and objects, and inspection, etc., to improve the flight efficiency, and then further improve the efficiency in other directions (e.g., left and right directions). Therefore, it is more desirable to use a ladder-shaped or monocoque frame instead of a radial frame.

The frame and mounting part comprising the aerial vehicle 100 are configured with materials that are strong enough to withstand flight and takeoff/landing. For example, resin, FRP, and other materials are suitable as structural materials for aerial vehicles because they are rigid and lightweight. When metals are used, aluminum, magnesium, or other materials with light specific gravity can be used to prevent weight gain while improving strength.

The motor mount 23, frame 21, and other parts provided by the flight part 20 may be separate parts and may be comprised of connected parts, or they may be molded as a single unit. By integrating the parts, the joints between each part can be made smooth, which is expected to reduce drag and improve fuel efficiency.

The aerial vehicle 100 may be equipped with landing legs 40, and the landing legs 40 may be further equipped with shock absorbers, such as dampers, to reduce the impact on the aerial vehicle when the landing legs are installed.

The frame 21 provided by the aerial vehicle 100 comprises at least two or more cross-sectional shapes in order to reduce the effect of wind on each during cruising of the aerial vehicle 100.

For example, in FIG. 2, when receiving wind from the right side of the direction of travel as seen from the aerial vehicle (hereinafter collectively referred to as wind from the right), it is the right frame 21b that is most affected. For example, in this case, the cross-sectional shape of the right frame 21b may be substantially wing-shaped. If the front edge of the substantially wing-shaped shape is on the outside of the aerial vehicle and the trailing edge is on the inside of the aerial vehicle, the drag force against the wind from the right side can be reduced. The substantially wing-shaped shape refers to a shape with the same characteristics as a symmetrical wing, in which the thickness increases starting from the leading edge and decreases from a predetermined position toward the trailing edge. However, it is not limited to this, but can also be a substantially wing-shaped shape in which the upper surface has less bulge than the lower surface (so-called inverted wing shape) or the lower surface has less bulge than the upper surface (so-called wing shape). This reduces the drag force when the frame is subjected to wind from the direction of the front edge, compared to a frame with a circular cross-sectional shape. The main purpose of the substantially wing-shaped shape in the invention is to take a shape that efficiently reduces drag, and the shape may be different from that of a wing whose main purpose is to generate lift, for example, it may be an inverted wing shape.

In the case of wind from the right, the wind is dampened by the right frame 21b and main body part, and the wind from the right that hits the left frame 21a is weakened. Therefore, the left frame 21a should be shaped to reduce drag force against wind from the left side as viewed from the aerial vehicle (hereinafter collectively referred to as wind from the left), rather than wind from the right. The cross-sectional shape of each frame should be shaped for drag reduction and streamlining. More preferably, the shape is a substantially wing-shaped shape, but it can also be an elliptical shape, trapezoidal shape, or any other shape that reduces drag, streamlines, etc. against wind received from one or more specific directions.

The cross-sectional shape of the right frame 21b and the left frame 21a may be symmetrical or asymmetrical. For example, if the right frame is adapted to wind from the right and the left frame is adapted to wind from the left, the cross-sectional shapes of the left and right frames extending in the front-back direction will be different. Furthermore, if the effect on the left and right frames is symmetrical, the cross-sectional shape of the frames will be symmetrical when looking at the cross-sectional shape of the same location on the frame in the front-rear direction.

When an aerial vehicle's propeller rotates, a twisted air flow called the propeller wake occurs behind the propeller. As shown in FIG. 1-FIG. 5, when the rotary wing parts of an aerial vehicle have a pull configuration, the part of each frame that is in the wake of the propeller is always exposed to the wind during the rotation of the propeller. The propeller wake has a lateral component depending on the direction of rotation of the propeller. It is desirable to determine the direction of motor rotation so that the propeller wake is directed from the outside to the inside of the aerial vehicle for both the right frame 21b and the left frame 21a in the left-right direction.

Since the shape that reduces drag, streamlinines, etc. is directional, drag reduction, streamlining, etc. can be performed efficiently by bringing the direction of the target natural wind and the propeller wake closer together in order to achieve the desired effect. If all motors of the aerial vehicle shown in FIG. 1 were to rotate in opposite directions, the directions of the wind and the propeller wake in the left and right directions would be opposite, and the right frame 21b and the left frame 21a may not be able to provide sufficient drag reduction and streamlining against the propeller wake.

In other words, if the frame shape of an aerial vehicle is shaped to be effective against winds from the outside of the left-right direction of the aerial vehicle, and the direction of the wake of the propeller produces lateral winds from the inside to the outside of the aerial vehicle, it will not be possible to achieve sufficient drag reduction and wind streamlining effects.

Crosswinds from the surrounding environment can hit the aerial vehicle in different directions, such as directly beside the aircraft or diagonally downward. Unless the aerial vehicle has a special mechanism such as a tilt-rotor mechanism, the pull-type rotary wing part always hits the frame at a fixed angle from diagonally upward because the air flow behind the propeller is a twisted air flow. The frame shape has a cross-sectional shape that is efficient in the direction of the propeller wake in the area susceptible to the propeller wake, and a cross-sectional shape that is independent of the wind direction of the propeller wake in the area not affected by the propeller wake, thereby enabling efficient response to the wind.

Figure 17:
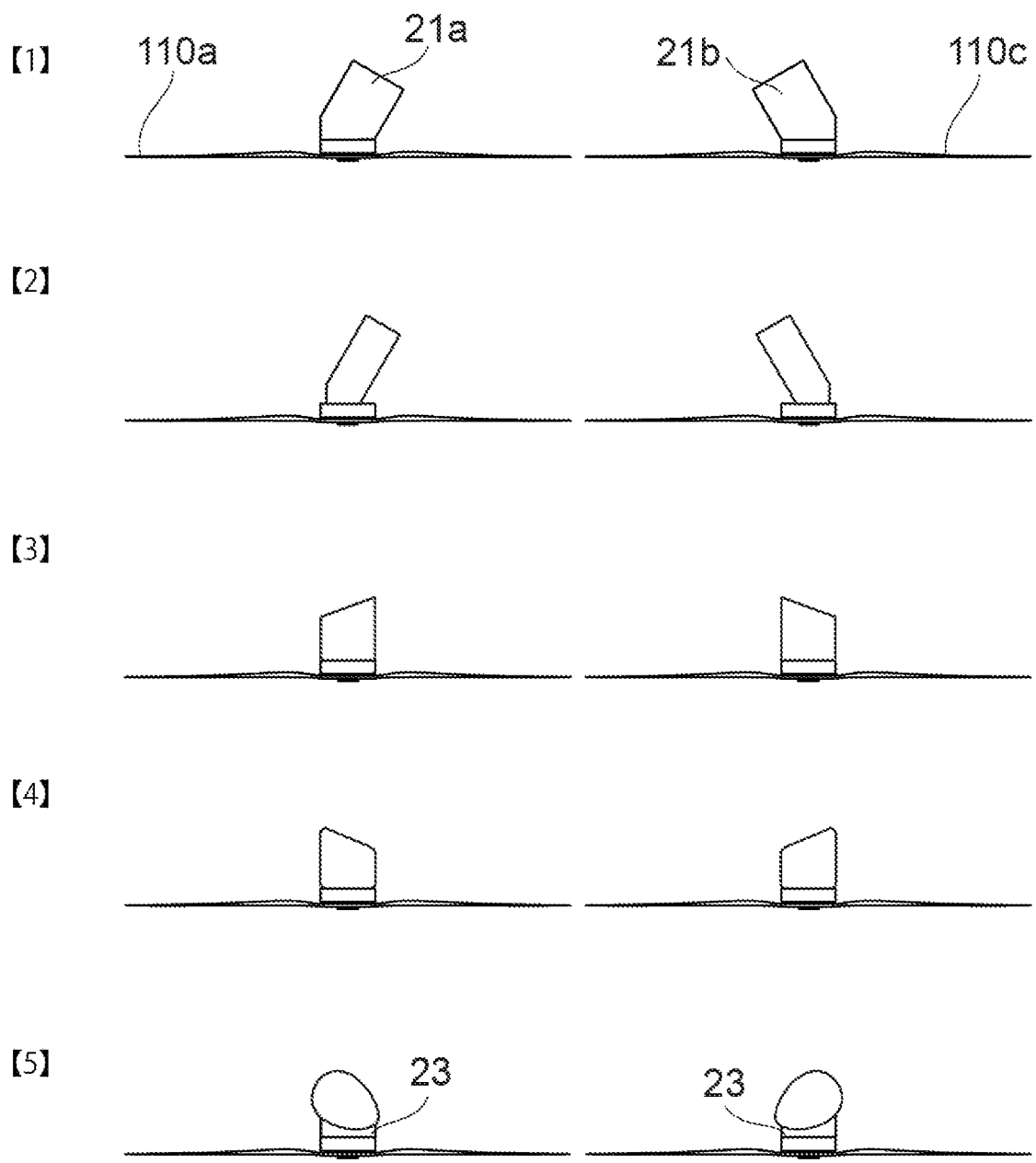
FIG. 17 shows examples of the cross-sectional shapes of the left and right frames in a push-type rotary wing part.
Figure 18:
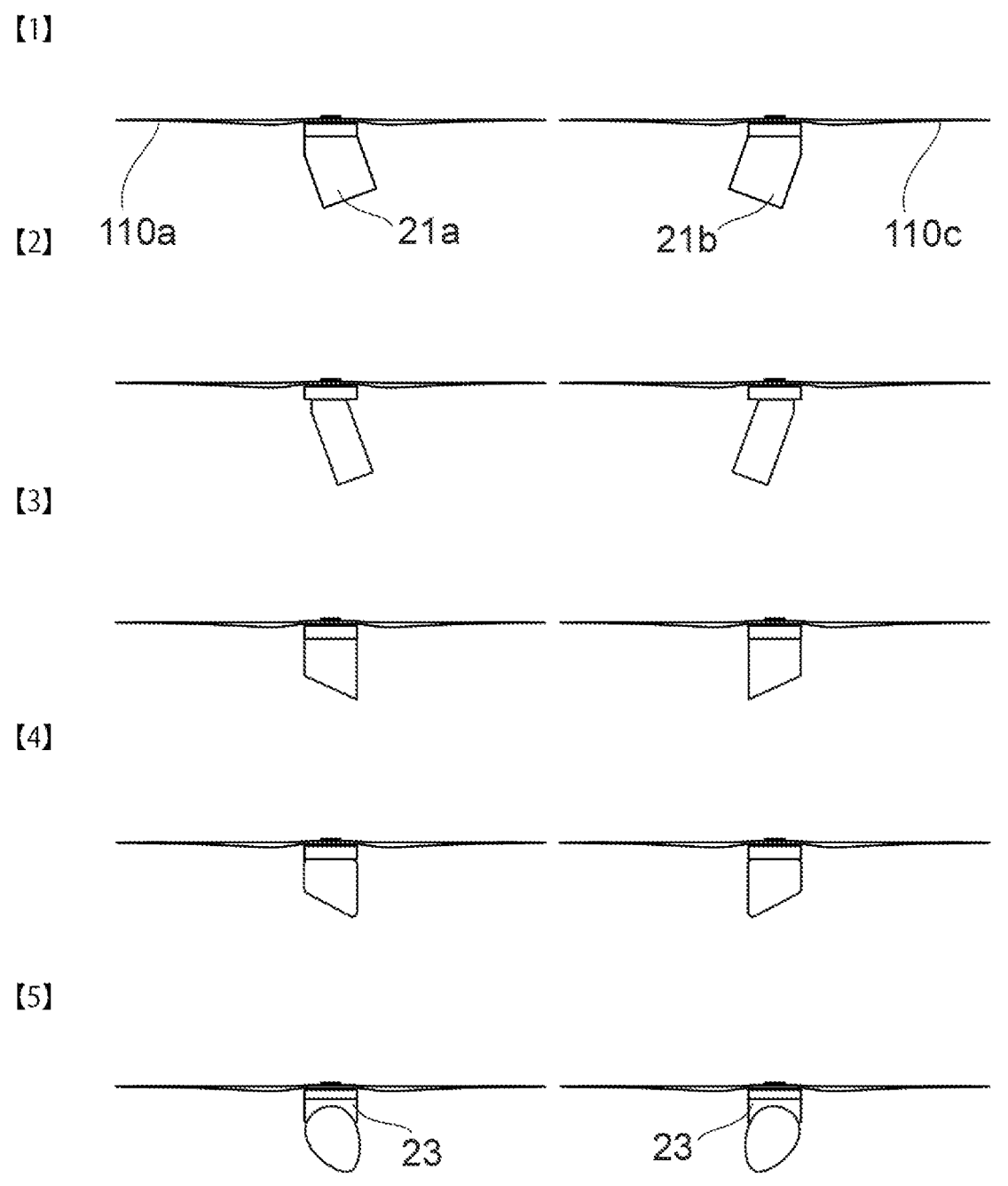
Figure 19:
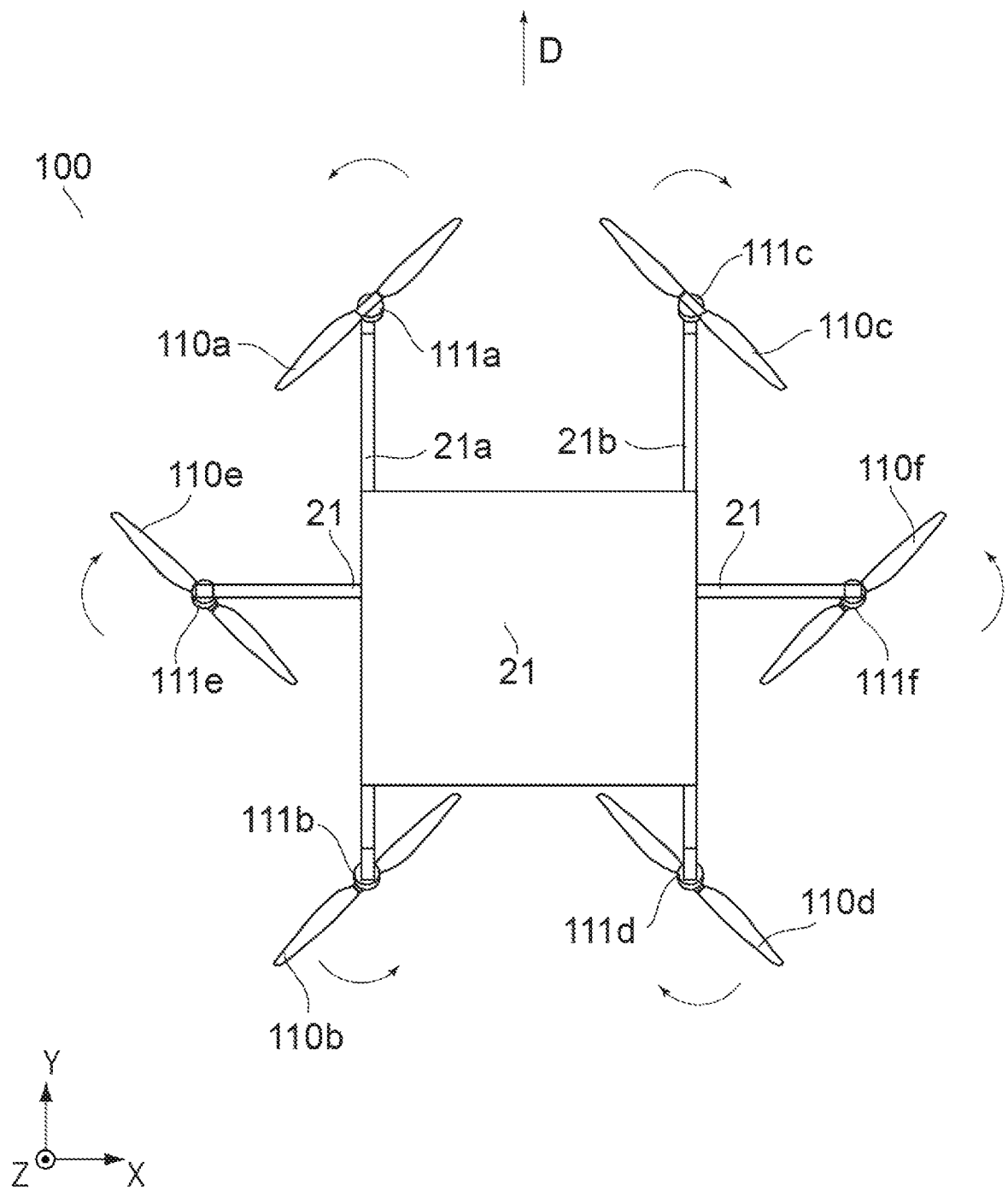
FIG. 19 is a conceptual view of other aerial vehicles according to the invention, viewed from the top.
Figure 20:
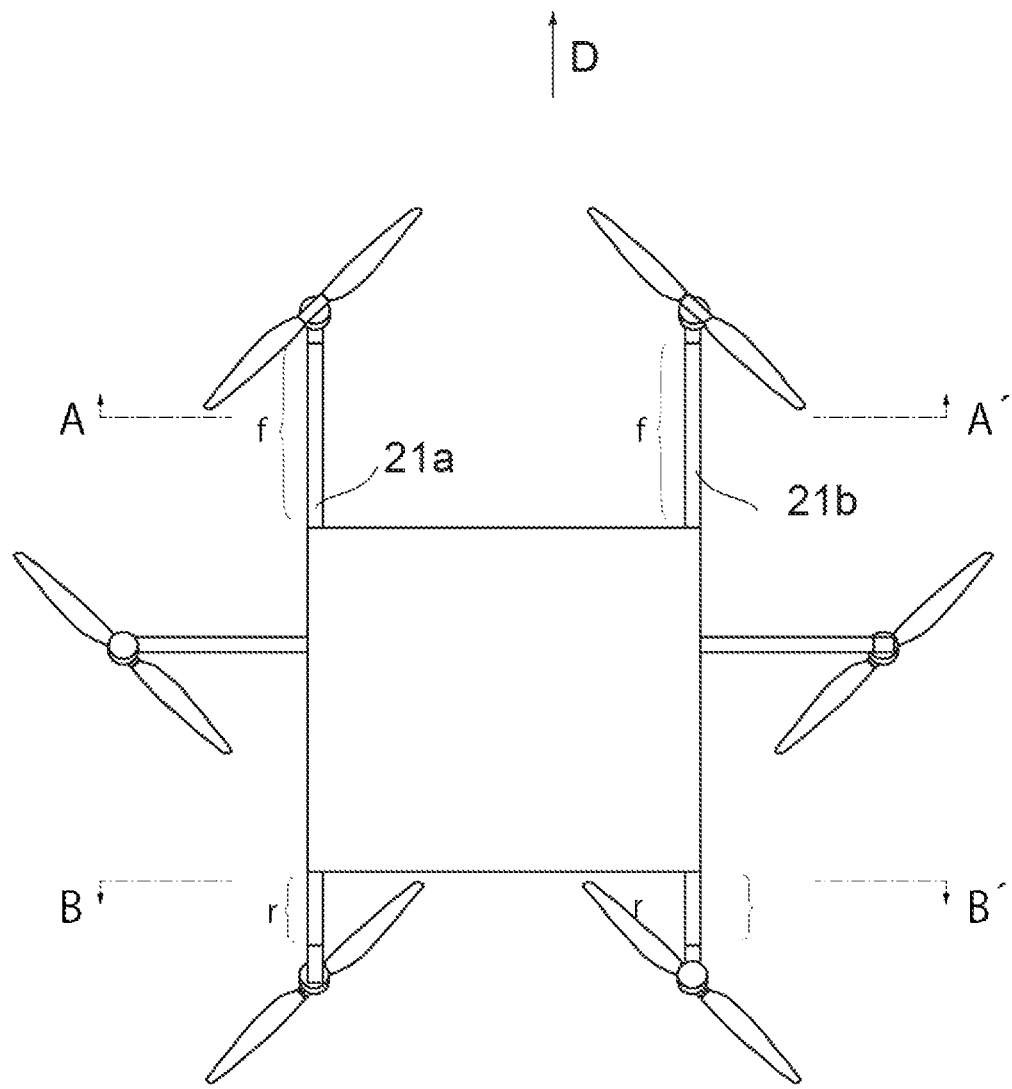
FIG. 20 is another top view of the aerial vehicle of FIG. 19.
Figure 21:
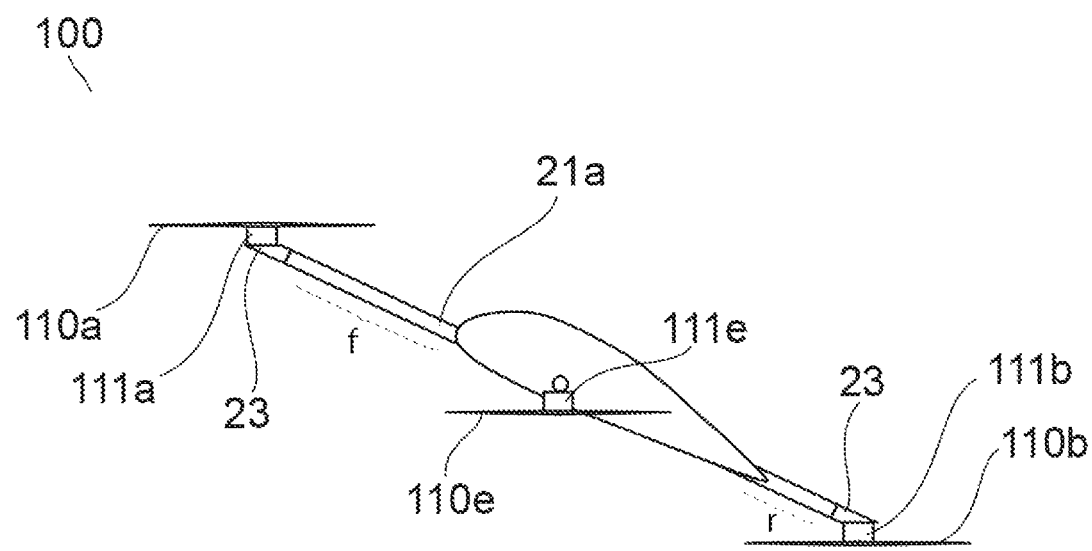
FIG. 21 is a side view of the aerial vehicle of FIG. 19.

FIG. 17 shows examples of the cross-sectional shapes of the right and left frames 21b and 21a in a push-type rotary wing part, and FIG. 18 shows examples of the cross-sectional shapes of the right and left frames 21b and 21a in the wake of the propeller in a pull-type rotary wing part. However, these shapes do not limit the cross-sectional shape or angle of the frames. The cross-sectional shape of each frame should be determined to be suitable in the operating environment and cost of the aerial vehicle 100, and the cross-sectional shape may be changed from part to part to make three, four or more types of frames.

When pull and push configurations are mixed, as in the aerial vehicles shown in FIG. 9-FIG. 13, the frame near the rotary wing part of the pull configuration should reduce drag and streamline against the flow behind the propeller, while the frame near the rotary wing part of the push configuration should streamline the air flowing toward the propeller. Since the effects to be exerted by each are different, the cross-sectional shapes will also be different.

Figure 12:
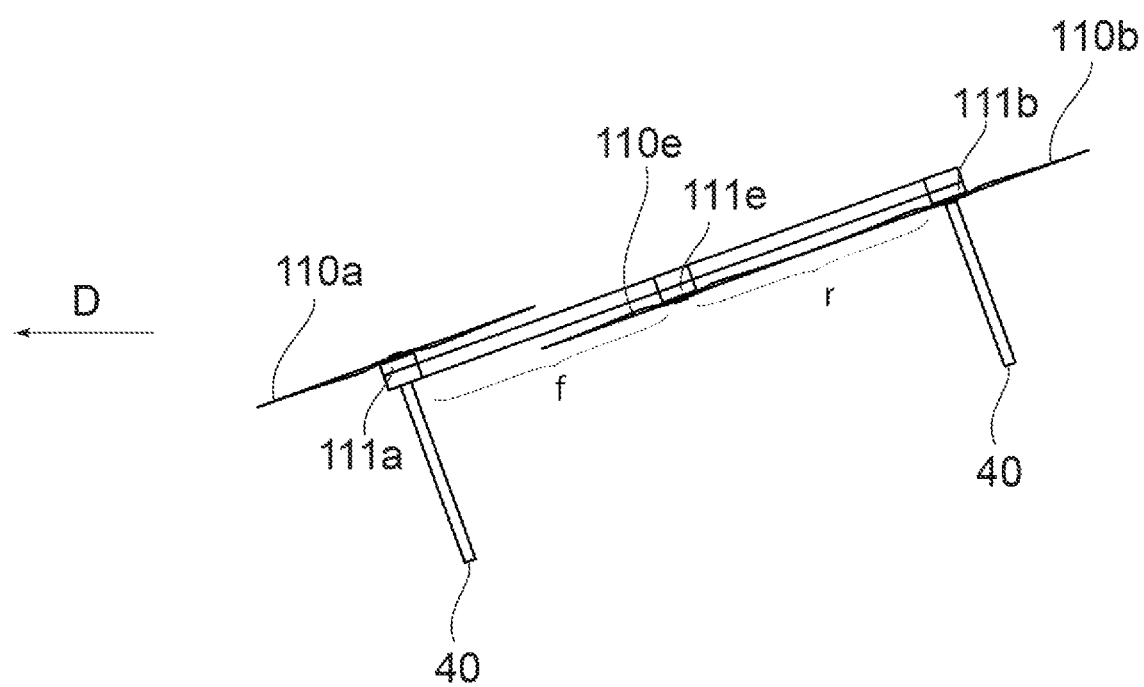
FIG. 12 is a side view of the aerial vehicle of FIG. 9 in cruise.
Figure 13:
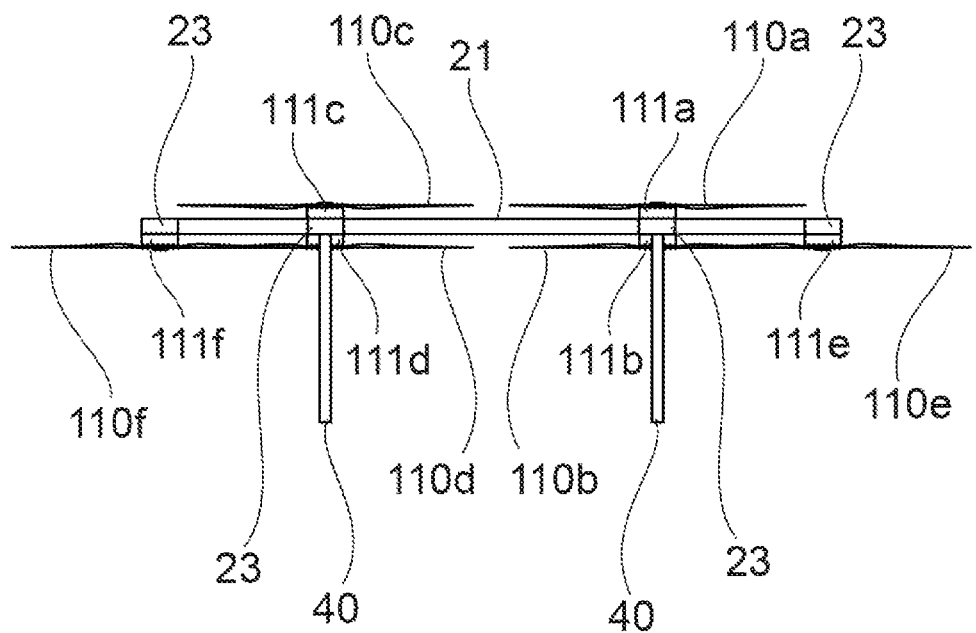
FIG. 13 is a front view of the aerial vehicle of FIG. 9.
Figure 14:
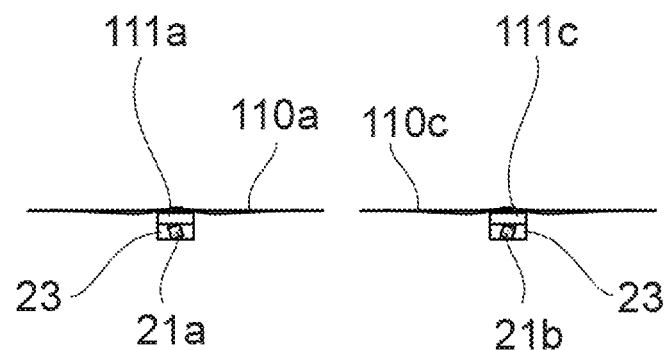
FIG. 14 is an A-A' sectional view of the aerial vehicle of FIG. 9.
Figure 14:
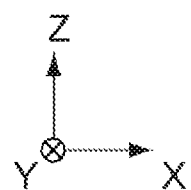
Figure 15:
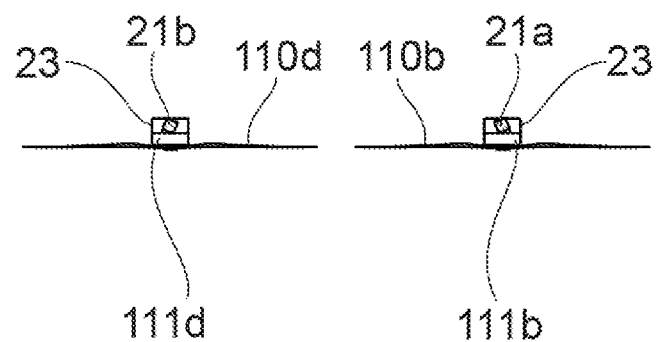
FIG. 15 is a B-B' section of the aerial vehicle of FIG. 9.
Figure 16:
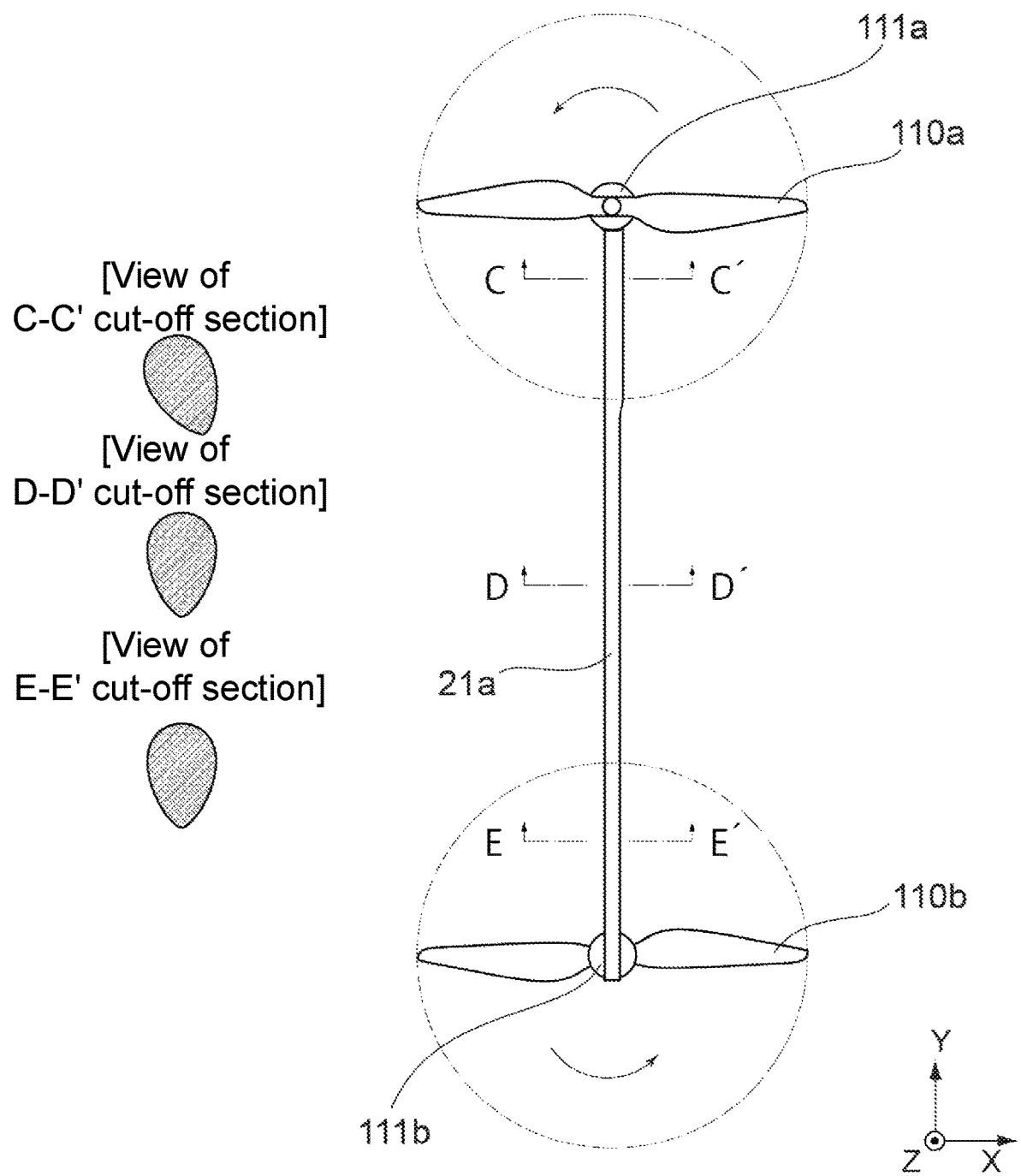
FIG. 16 is an example of the cross-sectional shape of a frame.

If the frame 21 provided by the aerial vehicle in cruising attitude has an increased frontal projected area compared to hovering, as shown in FIG. 12, for example, the flight efficiency is expected to be improved by changing the cross-sectional shape of each part of the frame, as shown in FIG. 16. In the C-C' cut section of the frame under the rotation radius of the pull-type rotary wing part, which is affected by at least the propeller wake, the angle is adjusted to the direction of rotation of the propeller wake. In the E-E' cut (and D-D' cut) of the frame above the radius of rotation of the rotary wing part of the push type, which is at least not affected by the wake of the propeller, the angle is adjusted to the wind received from the front due to the forward movement of the aerial vehicle. This prevents an increase in drag due to the frame during aerial vehicle cruise and improves flight efficiency.

Figure 22:
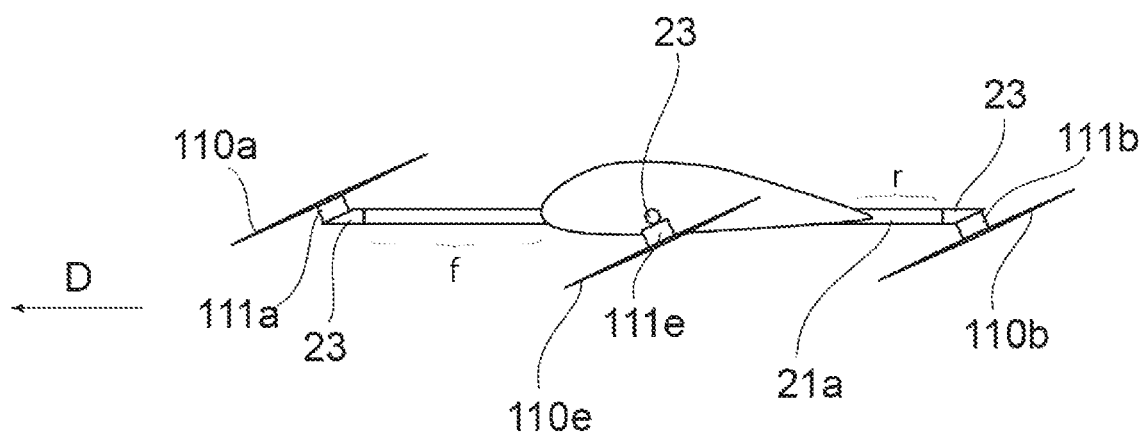
FIG. 22 is a side view of the aerial vehicle of FIG. 19 in cruise.
Figure 23:
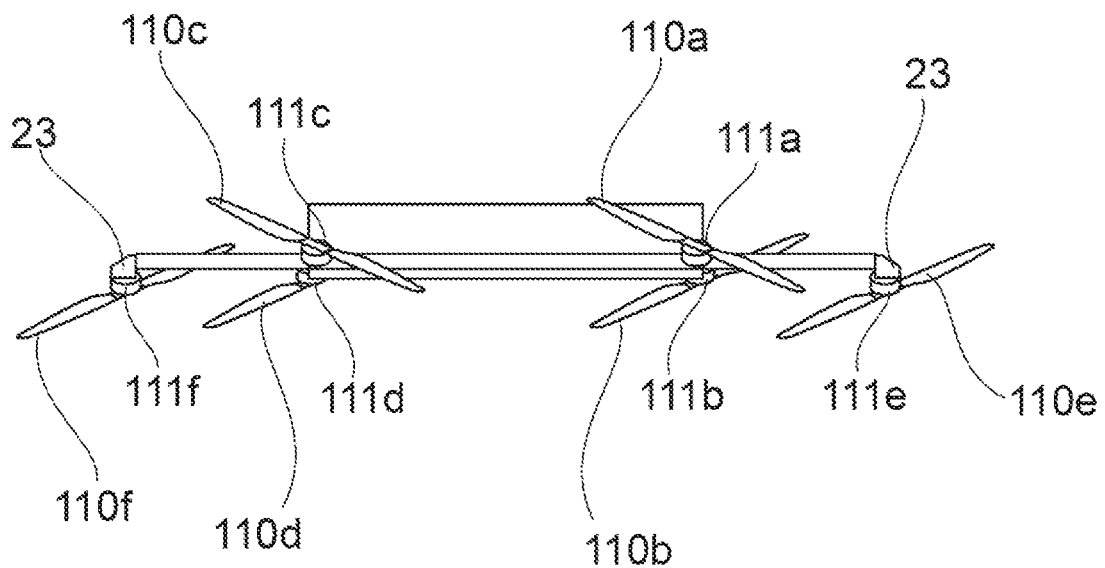
FIG. 23 is a front view of the aerial vehicle of FIG. 19.
Figure 23:
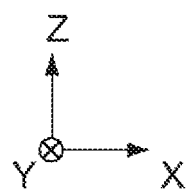
Figure 24:
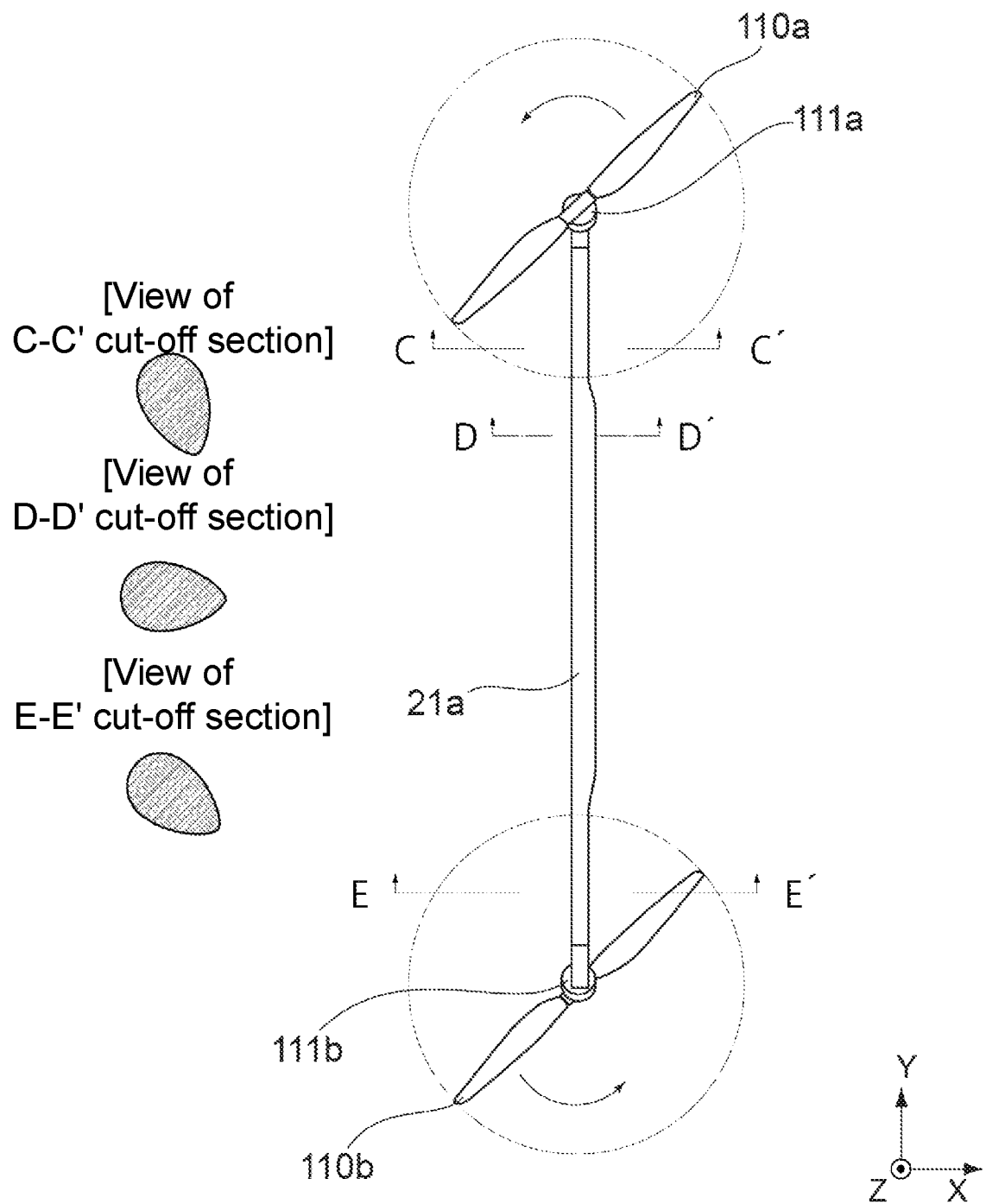
FIG. 24 is an example of the cross-sectional shape of a frame.
Figure 25:
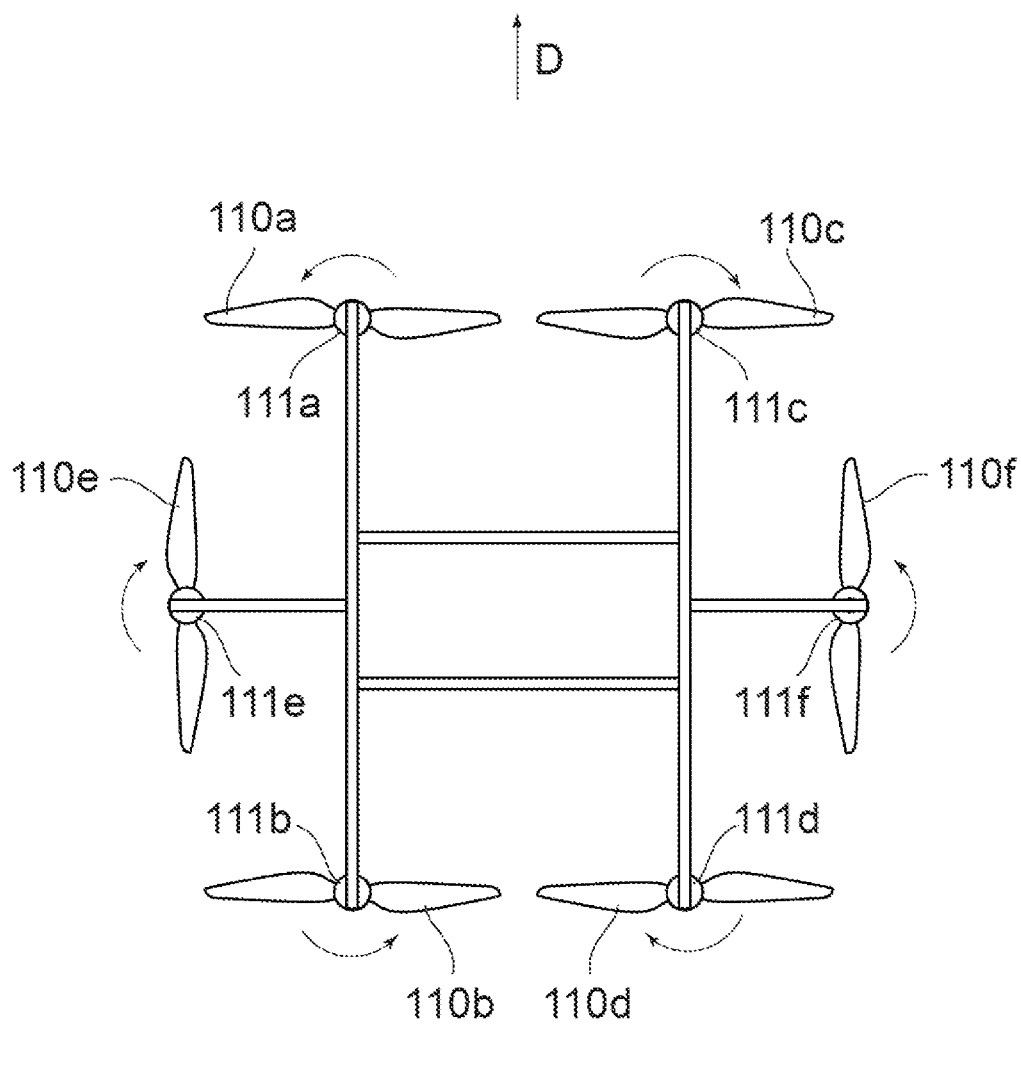
FIG. 25 is a conceptual view of other aerial vehicles according to the invention, viewed from the top.
Figure 25:
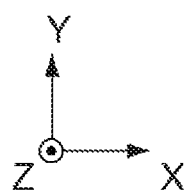
Figure 26:
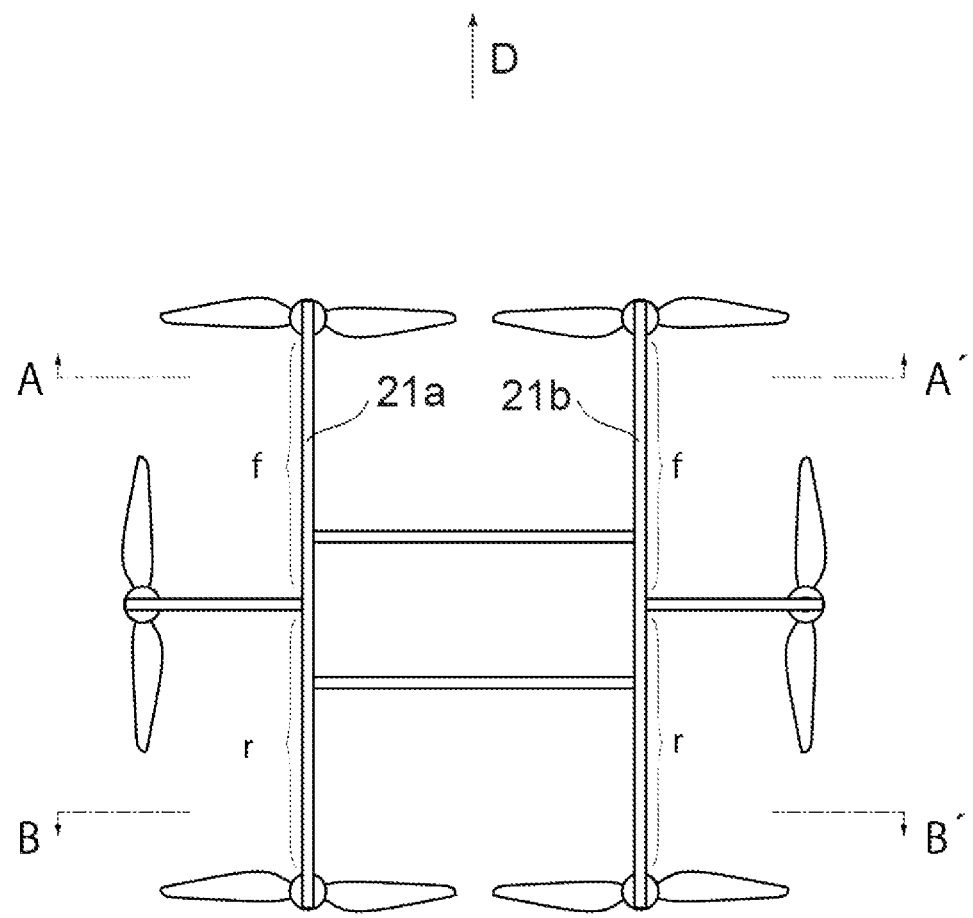
FIG. 26 is other top view of the aerial vehicle of FIG. 19.
Figure 27:
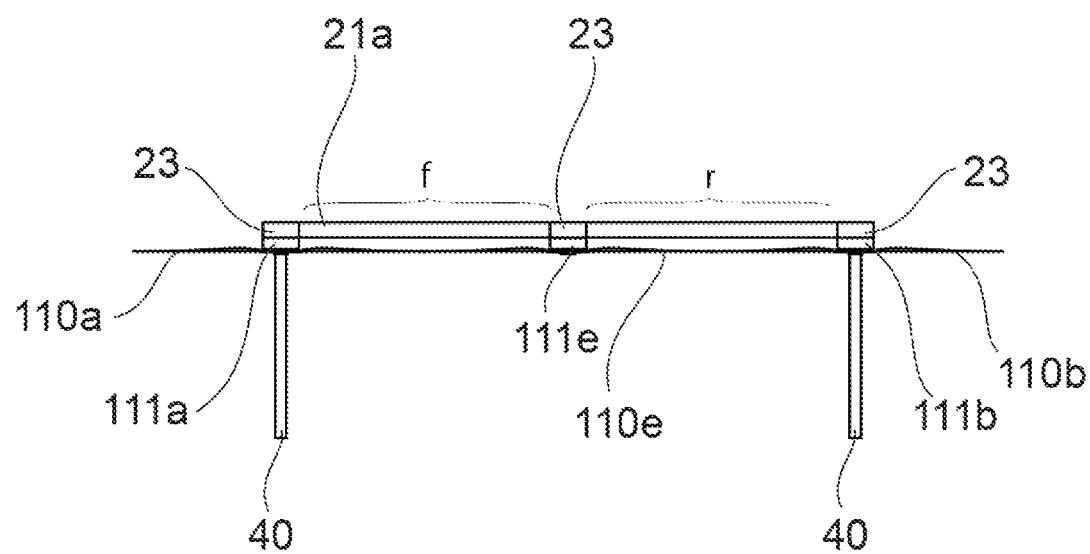
FIG. 27 is a side view of the aerial vehicle of FIG. 19.
Figure 28:
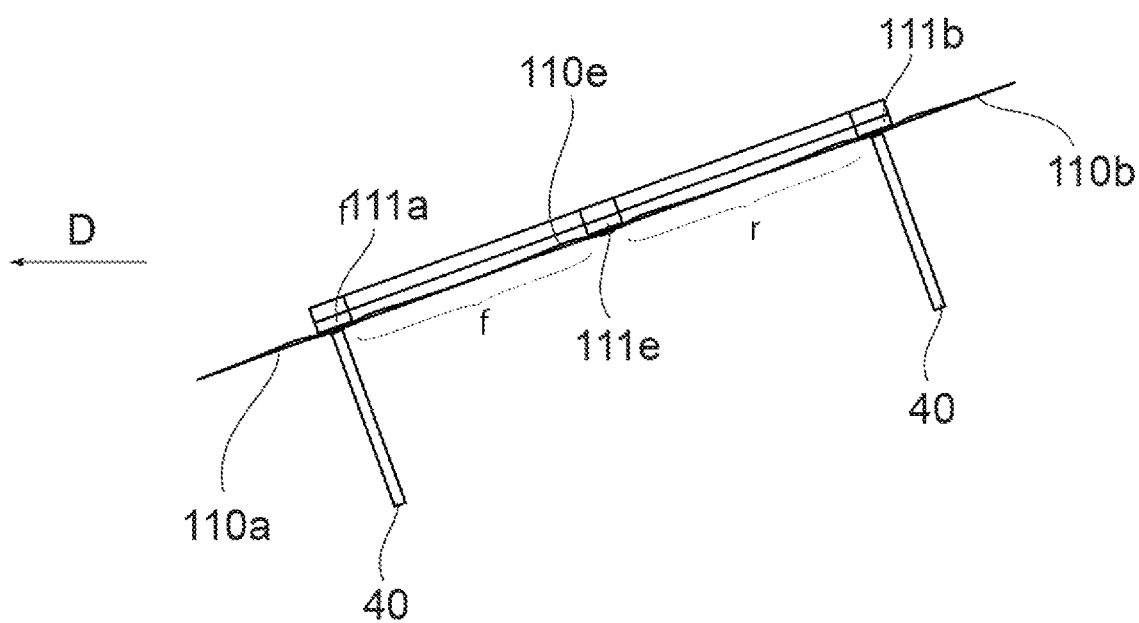
FIG. 28 is a side view of the aerial vehicle of FIG. 19 in cruise.
Figure 29:
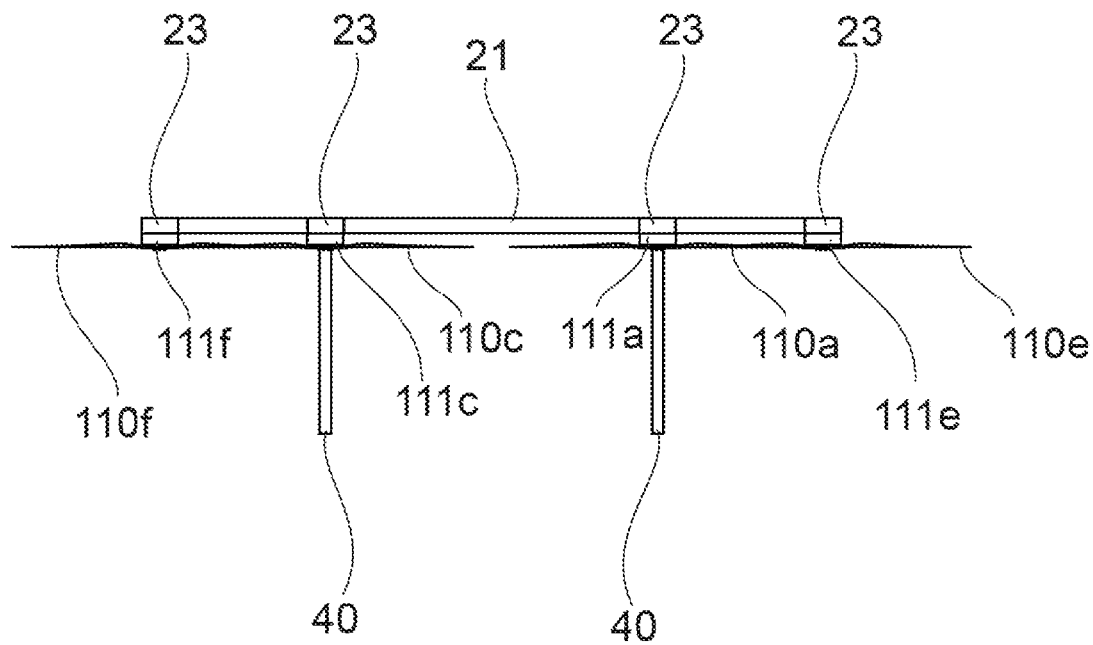
FIG. 29 is a front view of the aerial vehicle of FIG. 19.
Figure 29:
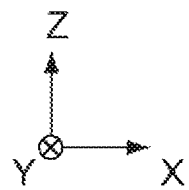
Figure 30:
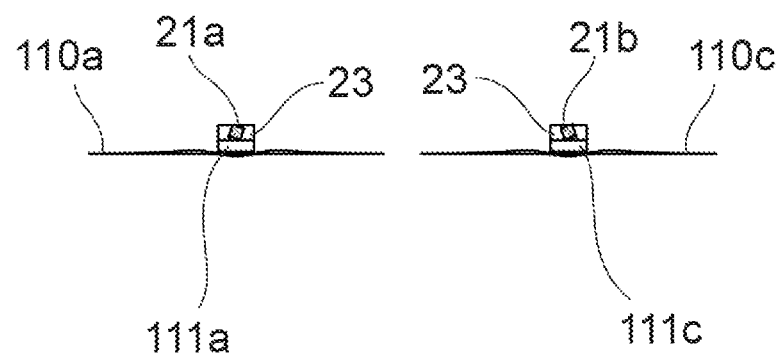
FIG. 30 is an A-A' sectional view of the aerial vehicle of FIG. 19.
Figure 31:
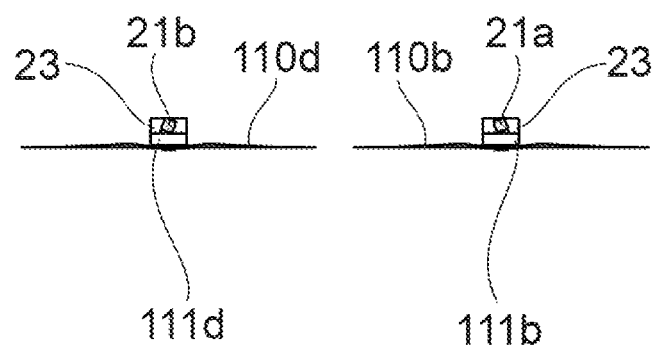
FIG. 31 is a B-B' section of the aerial vehicle of FIG. 19.

When the frame 21 provided by the aerial vehicle in the cruising attitude is closer to horizontal (frontal projected area decreases) than when hovering, as shown in FIG. 22, for example, the flight efficiency is expected to be improved by changing the cross-sectional shape of each section of the frame, as shown in FIG. 24. In the C-C' cut section, the angle is adapted to the direction of rotation of the propeller wake, and in the D-D' cut section, the angle is adapted to the wind received from the side of the aerial vehicle due to the environmental wind. In the E-E' cut section, the angle is adjusted to the wind received from the side of the aerial vehicle due to the environmental wind, and the angle is also provided for streamlining the airflow to the propeller. This prevents an increase in drag due to the frame during aerial vehicle cruise and improves flight efficiency.

As shown in FIG. 19-FIG. 23, when all the rotor blades equipped with aerial vehicles are in a push configuration, frame 21 is provided in a position where it is not affected by the propeller wake. Therefore, the frame in the push configuration does not need to consider the effect on the propeller wake flow, but reduces the drag force against the wind from the left and right directions that hits the aerial vehicle. It may also provide streamlining of the air before it is drawn into the propeller.

As described above, the relative winds striking the aerial vehicle's frame during flight vary depending on conditions such as the presence or absence of propeller wake due to the rotor blade configuration, the frame's attitude during forward motion, the size and rotational speed of the propeller, and the aerial vehicle's cruising speed. Therefore, the cross-sectional shape of the frame is determined to be desirable based on these conditions.

Details of the Second Embodiment

In the details of the second embodiment of this invention, the components that overlap with those of the first embodiment operate in the same manner, so they will not be described again.

A characteristic of this embodiment is that when each frame has a different shape, the frame 21 ($f$) in the front and the frame 21 ($r$) in the rear are configured so that the rear frame is wider when comparing the lateral area of the frame 21 ($f$) in the front and the frame 21 ($r$) in the rear when viewed laterally. More specifically, when the frame 21 comprises, for example, a round or square pipe, the lateral area (i.e., vertical thickness) of the frame when viewed laterally is wider in the rear frame section than in the front frame section. For example, it may be wider only at a certain position at the rear of the frame (more preferably, it may be wide enough to form a plane), or it may gradually increase from the front of the frame to the rear of the frame, or it may increase in steps for each predetermined length, but not limited to these. In this case, the horizontal thickness is not limited, and may simply be increased in the vertical direction with the overall horizontal thickness remaining the same, or only a portion of the horizontal thickness may be extended in the vertical direction. This makes it easier for the nose of the aerial vehicle to face upwind, since the rear of the aerial vehicle is more affected by the wind than the front when the aerial vehicle is exposed to wind from the lateral direction (the so-called weathervane effect). In relation to the first embodiment, for example, in the cross-sectional shape shown in FIG. 16, the C-C' cut plane is more inclined than the E-E' cut plane. As a result, the lateral area is wider on the E-E' cut plane. The weathervane effect can be achieved with this cross-sectional shape as it is, or the weathervane effect can be made larger by making the E-E' cut plane longer in the vertical direction than the D-D' cut plane, for example. The cross-sectional shape shown in FIG. 24 also produces the same weathervane effect. The C-C' cut plane has a larger lateral area than the E-E' cut plane due to its smaller inclination. However, the location of the C-C' cut-off plane is within the turning radius of the pull-type propeller, which is strongly influenced by the propeller wake and less susceptible to crosswinds. On the other hand, at the position of the E-E' cutting plane, there is no propeller wake flow with a push type propeller, and it is directly affected by crosswinds. Therefore, the E-E' cut-off surface has a wider lateral area than the D-D' cut-off surface, which also produces a weathervane effect. Thus, depending on the configuration of the propeller, there may be cases where the propeller is not affected by crosswinds even if it is located at front or rear. In this case, even if not all of the front frame sections are narrower than the rear side area, the wider rear side area will produce the weathervane effect in the front-rear relationship except for the frame sections located under the radius of rotation of the pull-type rotor blade.

This allows the aerial vehicle to face directly into the relative wind and improve flight efficiency, especially in aerial vehicles such as those shown in Patent Literature 1, where flight efficiency can be improved when the aerial vehicle is cruising in the nose direction, by providing a shape that facilitates the nose of the aerial vehicle to face upwind.

As described above, the area of the front frame 21($f$) and the rear frame 21($r$) in lateral view is different, and furthermore, the area of the rear frame 21($r$) in lateral view is wider than the area of the front frame 21($f$) in lateral view. As a result, it is possible to assist the aerial vehicle's automatic control to change the nose direction, or to allow the nose to naturally face upwind without automatic control of the nose direction.

When a specific part of the aerial vehicle is made to face upwind more easily, flight efficiency can be expected to improve not only for aerial vehicles that mainly cruise in a specific direction, but also for aerial vehicles that are mainly operated in hovering. For example, if the aerial vehicle is shaped to have the lowest drag when it receives wind from the nose direction, the nose of the aerial vehicle will naturally face upwind, enabling the aerial vehicle to turn its nose in the desired direction without yaw direction control.

It is possible to comprise a plurality of aerial vehicle configurations in each embodiment. It is advisable to comprise a suitable configuration in accordance with the cost in manufacturing the aerial vehicle and the environment and characteristics of the location where the aerial vehicle will be operated.

The above mentioned embodiments are merely examples to facilitate understanding of the invention and are not intended to be construed as limiting the invention. It goes without saying that the invention may be changed and improved without departing from its purpose, and that the invention includes its equivalents.

DESCRIPTION OF REFERENCE NUMERALS

10 Loaded object
20 Flight part
21 Frame
23 Motor mount
30 Loading part
40 Landing legs
100 Aerial vehicle
110$a$-110$f$ Propellers
111$a$-111$f$ Motors

The invention claimed is:

1. An aerial vehicle, comprising
a flight part including a frame to which a plurality of rotary wing parts including at least a propeller and a motor are connected,
wherein the frame has at least two or more different cross-sectional shapes,
wherein the frame includes a right frame and a left frame extending side-by-side in a front-rear direction of the aerial vehicle,
wherein, in at least one of the right frame and the left frame, the frame portion at least below a radius of rotation of a rotor blade of the propeller has a substantially wing-shaped portion inclined in a direction corresponding to the direction of rotation of the propeller, and other frame portions have a substantially wing-shaped portion with a leading edge located on an upper side of the aerial vehicle and a trailing edge located on a lower side of the aerial vehicle along a vertical center line in the frame.

2. The aerial vehicle according to claim 1, wherein the frame comprises a right frame and a left frame extending side-by-side in the front-rear direction of the aerial vehicle, wherein at least one of the right frame and the left frame has a substantially wing-shaped portion with the leading edge located on the upper side of the aerial vehicle and the trailing edge located on the lower side of the aerial vehicle with respect to the vertical center line in the frame.

3. The aerial vehicle according to claim 2, wherein the substantially wing-shaped shape is a symmetric wing-shaped shape.

4. The aerial vehicle according to claim 1, wherein the frame includes a front frame and a rear frame, wherein a lateral area of the rear frame is wider than a lateral area of the front frame.

5. The aerial vehicle according to claim 1, wherein the frame includes a frame portion located below the radius of rotation of the rotor blades, wherein the frame portion is forward of a front frame.

6. The aerial vehicle according to claim 2, wherein the frame includes a front frame and a rear frame, wherein a lateral area of the rear frame is wider than a lateral area of the front frame.

7. The aerial vehicle according to claim 3, wherein the frame includes a front frame and a rear frame, wherein a lateral area of the rear frame is wider than a lateral area of the front frame.

8. The aerial vehicle according to claim 1, wherein the frame includes a front frame and a rear frame, wherein a lateral area of the rear frame is wider than a lateral area of the front frame.

9. The aerial vehicle according to claim 2, wherein the frame includes a frame portion located below the radius of rotation of the rotor blades, wherein the frame portion is forward of a front frame.

10. The aerial vehicle according to claim 3, wherein the frame includes a frame portion located below the radius of rotation of the rotor blades, wherein the frame portion is forward of a front frame.

11. The aerial vehicle according to claim 1, wherein the frame includes a frame portion located below the radius of rotation of the rotor blades, wherein the frame portion is forward of a front frame.

12. An aerial vehicle, comprising
a flight part including a frame to which a plurality of rotary wing parts including at least a propeller and a motor are connected,
wherein the frame has at least two or more different cross-sectional shapes,
wherein the frame includes a right frame and a left frame extending side-by-side in a front-rear direction of the aerial vehicle,
wherein, in at least one of the right frame and the left frame, the frame portion at least below a radius of rotation of a rotor blade of the propeller has a substantially wing-shaped portion inclined in a direction corresponding to the direction of rotation of the propeller, and the frame portion at least above the radius of rotation of the push-type rotor blade has a substantially wing-shaped portion inclined in the direction of streamlining the air flowing to the propeller.

13. The aerial vehicle according to claim 12, wherein the frame includes a front frame and a rear frame, wherein a lateral area of the rear frame is wider than a lateral area of the front frame.

14. The aerial vehicle according to claim 12, wherein the frame includes a frame portion located below the radius of rotation of the rotor blades, wherein the frame portion is forward of a front frame.

15. An aerial vehicle, comprising
a flight part including a frame to which a plurality of rotary wing parts including at least a propeller and a motor are connected,
wherein the frame has at least two or more different cross-sectional shapes,
wherein the frame includes a right frame and a left frame extending side-by-side in a front-rear direction of the aerial vehicle,
wherein, in at least one of the right frame and the left frame, the frame portion at least below a radius of rotation of a rotor blade of the propeller has a substantially wing-shaped portion inclined in a direction corresponding to the direction of rotation of the propeller, and the other portion has an inclination at an angle different from inclination and has a substantially wing-shaped portion with a leading edge located on an upper side of the aerial vehicle and a trailing edge located on a lower side of the aerial vehicle with respect to a vertical center line of the frame.

16. The aerial vehicle according to claim 15, wherein the frame includes a front frame and a rear frame, wherein a lateral area of the rear frame is wider than a lateral area of the front frame.

17. The aerial vehicle according to claim 15, wherein the frame includes a frame portion located below the radius of rotation of the rotor blades, wherein the frame portion is forward of a front frame.

* * * * *